United States Patent
Micucci et al.

(10) Patent No.: US 9,602,597 B2
(45) Date of Patent: *Mar. 21, 2017

(54) SYSTEM AND METHOD FOR SYNCHRONIZING DATA OBJECTS IN A CLOUD BASED SOCIAL NETWORKING ENVIRONMENT

(71) Applicant: salesforce.com, inc., San Francisco, CA (US)

(72) Inventors: Michael Micucci, San Francisco, CA (US); Ronald Fischer, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,148

(22) Filed: Mar. 25, 2016

(65) Prior Publication Data

US 2016/0212211 A1    Jul. 21, 2016

Related U.S. Application Data

(63) Continuation of application No. 13/861,293, filed on Apr. 11, 2013, now Pat. No. 9,307,006.

(60) Provisional application No. 61/622,950, filed on Apr. 11, 2012.

(51) Int. Cl.
| | |
|---|---|
| *H04L 29/08* | (2006.01) |
| *H04L 29/06* | (2006.01) |
| *G06F 17/30* | (2006.01) |
| *G06Q 50/00* | (2012.01) |

(52) U.S. Cl.
CPC .... *H04L 67/1095* (2013.01); *G06F 17/30174* (2013.01); *H04L 65/403* (2013.01); *H04L 67/02* (2013.01); *H04L 67/26* (2013.01); *G06Q 50/01* (2013.01)

(58) Field of Classification Search
CPC ........ H04L 67/02; H04L 67/26; H04L 65/403
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

USPTO, Non-final Office Action issued in U.S. Appl. No. 13/861,293, dated Apr. 9, 2015.

(Continued)

*Primary Examiner* — Lashonda Jacobs
(74) *Attorney, Agent, or Firm* — Lorenz & Kopf LLP

(57) ABSTRACT

Methods and systems are provided for synchronizing and sharing data objects in a cloud based social networking environment of the type including a collaboration cloud. The method includes defining a sharing configuration based on at least one metadata key word, within the collaboration cloud, the sharing configuration including a second computing device; running a dedicated client synchronization application on a first computing device; updating a data object using the first computing device; automatically synchronizing the updated data object with the collaboration cloud; and propagating, using the collaboration cloud, the updated data object to the second computing device.

20 Claims, 45 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,970,850 B1* | 6/2011 | Callanan .............. H04L 51/046 709/206 |
| 7,991,764 B2 | 8/2011 | Rathod |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,140,513 B2* | 3/2012 | Ghods ................... G06F 9/541 707/706 |
| 8,150,913 B2 | 4/2012 | Cheah |
| 8,166,013 B2 | 4/2012 | Bandaru et al. |
| 8,209,308 B2 | 6/2012 | Rueben et al. |
| 8,275,836 B2 | 9/2012 | Beaven et al. |
| 8,326,814 B2* | 12/2012 | Ghods ................... G06F 9/541 707/703 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0111415 A1* | 6/2004 | Scardino ............. G06F 17/3028 |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0010270 A1 | 1/2008 | Gross |
| 2008/0077631 A1* | 3/2008 | Petri .................. G06F 17/2205 |
| 2008/0147487 A1 | 6/2008 | Hirshberg |
| 2008/0209320 A1 | 8/2008 | Mawhinney et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0249224 A1* | 10/2009 | Davis .................... G06Q 10/10 715/753 |
| 2009/0254589 A1* | 10/2009 | Nair .................. G06F 17/30581 |
| 2010/0036929 A1* | 2/2010 | Scherpa ................ G06Q 10/10 709/207 |
| 2010/0125502 A1 | 5/2010 | Solomon et al. |
| 2010/0217757 A1 | 8/2010 | Fujioka |
| 2010/0241576 A1 | 9/2010 | Beeri |
| 2011/0209067 A1 | 8/2011 | Bogess et al. |
| 2011/0218958 A1 | 9/2011 | Warshavsky et al. |
| 2011/0247051 A1 | 10/2011 | Bulumulla et al. |
| 2011/0258204 A1 | 10/2011 | Hubbard et al. |
| 2012/0042218 A1 | 2/2012 | Cinarkaya et al. |
| 2012/0221520 A1* | 8/2012 | Garrett ................ G06F 17/3089 707/622 |
| 2012/0233137 A1 | 9/2012 | Jakobson et al. |
| 2012/0290407 A1 | 11/2012 | Hubbard et al. |
| 2012/0328259 A1* | 12/2012 | Seibert, Jr. ............ G06F 17/212 386/230 |
| 2013/0013560 A1* | 1/2013 | Goldberg .......... G06F 17/30174 707/634 |
| 2013/0014023 A1* | 1/2013 | Lee ...................... G06Q 10/103 715/751 |
| 2013/0124638 A1* | 5/2013 | Barreto .................. G06F 15/16 709/205 |
| 2013/0185347 A1* | 7/2013 | Romano ............. H04L 12/1818 709/203 |
| 2013/0198600 A1* | 8/2013 | Lockhart ............... G06F 17/241 715/230 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0268480 A1* | 10/2013 | Dorman ............ G06F 17/30575 707/608 |
| 2013/0268491 A1* | 10/2013 | Chung .............. G06F 17/30174 707/634 |
| 2013/0275398 A1* | 10/2013 | Dorman ............ G06F 17/30126 707/693 |
| 2014/0075130 A1* | 3/2014 | Bansal .............. G06F 17/30194 711/153 |
| 2014/0279846 A1* | 9/2014 | Srinivasan ........ G06F 17/30011 707/608 |
| 2014/0330776 A1* | 11/2014 | Chen ................. G06F 17/30176 707/610 |
| 2014/0379648 A1* | 12/2014 | Chiu ................. G06F 17/30174 707/624 |

OTHER PUBLICATIONS

Response to non-final Office Action for U.S. Appl. No. 13/861,293, dated Jul. 10, 2015.
USPTO, Final Office Action issued in U.S. Appl. No. 13/861,293, dated Sep. 22, 2015.
Response to non-final Office Action for U.S. Appl. No. 13/861,293, dated Nov. 3, 2015.
USPTO, Notice of Allowance issued in U.S. Appl. No. 13/861,293, dated Nov. 25, 2015.
Final Office Action for U.S. Appl. No. 12/437,418, mailed Apr. 16, 2012.
Final Office Action for U.S. Appl. No. 12/356,429, mailed May 2, 2012.
Notice of Allowance for U.S. Appl. No. 12/819,402, mailed May 14, 2012.
Non-Final Office Action for U.S. Appl. No. 13/453,802, mailed Jun. 8, 2012.
Linear Combination—Wikipedia (http://en.wikipedia.org/wiki/Linear_Combination (accessed Jul. 16, 2012).

* cited by examiner

▽ Marketing Information
Primary Campaign Source
Load Source       Trade Show ▽ Marketing Information
Created By        Scott Thompson  8/27/2012 9:04 PM    Opportunity Resend Type    Advanced [Change]
Last Modified By  Scott Thompson  8/27/2012 9:04 PM    Created Date               8/12/2012 9:04 PM

1004

**Products (North America*)**                                                      Products (North America*) Help ⓘ
[Edit] [Delete] [More ▼]
[Add Product] [Edit All] [Choose Price Book] [Sort]

| Action | Product | Product Code | Quantity | List Price | Sales Price | Discount | Total Price | Schedule | Data |
|---|---|---|---|---|---|---|---|---|---|
| Edit | Del | Alpha Product | S110 | 1.00 | $2,000.00 | $2,000.00 | | $2,000.00 | | |

Quotes                                                                          Quotes Help ⓘ
[New Quote]

| Action | Quote Number | Quote Name | Grand Total | Discount | Synching | Expiration Date | Status | Created By |
|---|---|---|---|---|---|---|---|---|
| Edit | Del | 000000003 | NC | $2,000.00 | 0.00% | ⟳ | | Draft | Scott Thompson 9/31/2012 12:34 PM |

Contact Roles                                                                   Contact Roles Help ⓘ
[New]
No records to display

1006

Activity History                                                                Activity History Help ⓘ
[Log A Call] [Mail Merge] [Send an Email] [View All]

| Action | Subject | Name | Due Date | Assigned To | Last Modified Date/Time |
|---|---|---|---|---|---|
| Edit | Del | Connect | | 6/23/2012 | Bill Lewis | 6/22/2010 9:05PM |
| Edit | Del | Left voicemail | | 6/23/2012 | Bill Lewis | 6/22/2010 9:05PM |

Open Activities                                                                 Contact Roles Help ⓘ
[New Task] [New Task]

SYSTEM AND METHOD FOR SYNCHRONIZING DATA OBJECTS IN A CLOUD BASED SOCIAL NETWORKING ENVIRONMENT

CROSS-REFERENCE TO RELATED APPLICATION

This application is a Continuation of U.S. application Ser. No. 13/861,293, filed Apr. 11, 2013, now U.S. Pat. No. 9,307,006, which claims the benefit of U.S. provisional patent application Ser. No. 61/622,950 filed Apr. 11, 2012, the entire contents of which are incorporated herein by this reference.

TECHNICAL FIELD

Embodiments of the subject matter described herein relate generally to computer systems and applications for synchronizing data objects and, more particularly, to a method for automatically synchronizing files between a cloud-based social networking server and an associated client application running on desktop and mobile computing devices.

BACKGROUND

The unprecedented growth of social technologies has redefined the way people connect and communicate. In social environments, on-line social networks such as Facebook™, Pinterest™, Tumblr™, Google+™ Hootsuite™, and Twitter™ have forever changed the way people share information with each other. In business environments, enterprise social network platforms such as Chatter™, released in June 2010 by Salesforce™ and available at www.salesforce.com, have revolutionized the way people collaborate with each other in pursuing business opportunities. Chatter users track projects and sales opportunities by receiving broadcast updates about coworkers, files, and other project related data objects. Users can also form groups and post messages on each other's profiles to facilitate collaboration.

In addition, the explosion of mobile computing technologies has driven business practices to become increasingly ubiquitous through the use of virtual offices leveraging tablets, laptops, and iPhone™ and Android™ handsets across multiple operating systems.

At the same time, software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Presently known methods for synchronizing data objects across multiple users and/or devices include the Dropbox™ file hosting system available at www.dropbox.com. Such systems typically involve manually updating the file, either locally or through a web-based interface to a service cloud where the file is maintained, and manually uploading the updated file to the service cloud. The updated file may then be shared with other users and devices. However, manual file synchronization and sharing can be cumbersome, time consuming, and error prone.

Systems and methods are thus needed for automatically synchronizing data objects with a social network service cloud, and for automatically and seamlessly sharing the updated files among pre-configured users, devices, and groups within an enterprise network.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

FIGS. 6-10 are screen shots illustrating various aspects of an on line social networking environment in accordance with an embodiment;

FIGS. 28-38 are screen shots illustrating various techniques for adding objects to a file synchronizing and sharing folder in accordance with various embodiments; and FIGS. 39-46 are screen shots illustrating a method for targeting a group when adding content to a file synchronizing and sharing folder in accordance with various embodiments.

DETAILED DESCRIPTION

Embodiments of the subject matter described herein generally relate to systems and methods for automatically synchronizing updated data objects (e.g., files) with a remote service cloud, and for seamlessly sharing the updated files in real time or near real time with a predetermined group of designated users and computing devices.

The Chatter™ collaboration cloud is a web based enterprise file sharing solution that allows users to share, collaborate on, and manage files and other data objects with any number of authorized users or groups within their company or organization. The Chatterbox™ synchronization application is an adjunct to the Chatter system and includes a client application automatically synchronizes updated files with the cloud, thereby leveraging the pre-existing social network connections in the enterprise platform. Although the present disclosure is discussed in the context of Chatter and Chatterbox systems, those skilled in the art will appreciate that the techniques described herein may be implemented in any platform or computing environment which involves the synchronization of a data object with a service cloud, and subsequent sharing of the object with one or more enterprise devices, either directly (device-to-device) or via the cloud.

Figure 1:
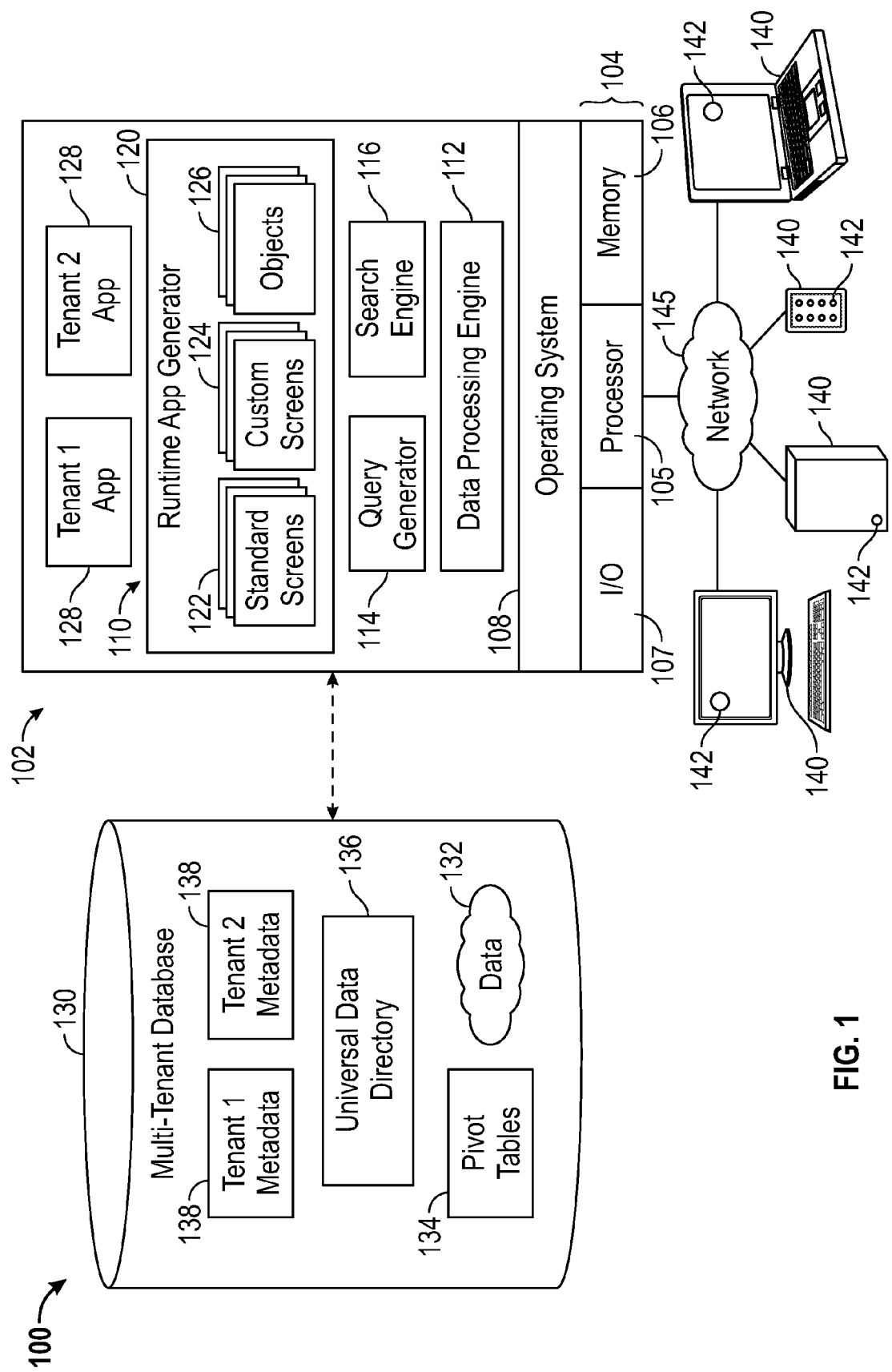
FIG. 1 is a schematic block diagram of a multi-tenant computing environment in accordance with an embodiment.

Turning now to FIG. 1, an exemplary cloud based collaboration solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

In addition to the foregoing "dedicated" syncing clients, the present disclosure also contemplates the automatic sharing of data and files into applications, such as Microsoft Word™, such that saving a document in Word would automatically sync the document to the collaboration cloud. In an embodiment, each client device, application, or web client is suitably configured to run a client application 142, such as the Chatterbox file synchronization module or other application for performing similar functions, as described in greater detail below.

An alternative vector into the automatic syncing and sharing may be implemented by an application protocol interface (API), either in lieu of or in addition to the client application 142. In this way, a developer may create custom applications/interfaces to drive the sharing of data and/or files (and receive updates) with the same collaboration benefits provided by the client application 142.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In accordance with various embodiments, application 128 includes the functionality of a collaboration solution such as the Chatter system, as well as the functionality of a synchronization application such as the Chatterbox module. As such, application 128 is implemented at the server to facilitate synchronization of data objects between the cloud and various computing devices connected to the cloud, as described in detail below. Specifically, application 128 allows a user to update files locally on the desk top, lap top, tablet, hand held, or other mobile device, and automatically synchronize the updated files with the multi-tenant database without having to manually upload the updated file. Application 128 seamlessly shares the updated files with all designated users and/or devices within a particular enterprise social network.

As briefly mentioned above, presently known techniques for synchronizing updated files with a cloud based database typically require the user to open a web browser, log onto a dedicated web portal, and thereby access those files stored on the multi-tenant database which the user is authorized to access. The creation, deletion, and updating of data objects (files) is accomplished either locally on the device, or through interaction with the multi-tenant database via a web-based user interface which may include customer relationship management (CRM) tools such as those available at www.salesforce.com. Once updated, the user must upload the file to the cloud, and define the entities with which the file is to be shared, typically by entering a name, email address, or other identifying indicia of the entities with whom the file is desired to be shared.

In accordance with various embodiments of the present disclosure, a data object synchronization application allows the user to create, delete, and revise files and automatically synchronize those files with other users on the enterprise social network without having to manually upload the updated file or separately configure file sharing.

In an embodiment, a user may install the file synchronization client application 142 (e.g., Chatterbox) on any lap top, desk top, or mobile computing device, and identify or "register" the device within one or more groups within the enterprise social network running on the server 102. The client application 142 includes a background process which maintains a persistent connection (e.g., 24 hours per day and seven days per week) between the device and the service cloud, for example via the Internet. The user may then update local versions of files, and automatically synchronize updated versions with and receive updated versions from the collaboration cloud without having to separately access the web-based interface.

In a further embodiment, the file synchronization application 142 comprises a cross-platform application running on the desk top or mobile computing device for seamlessly synchronizing a user's files with a cloud-based multi-tenant database. In the context of this disclosure, the term "cross-platform" implies that the synchronization engine is embodied in a single code base (i.e., application) configured to function across various platforms such as, for example, Windows™, Mac™, iOS™, Android™, and Linux™ operating systems.

Figure 2:
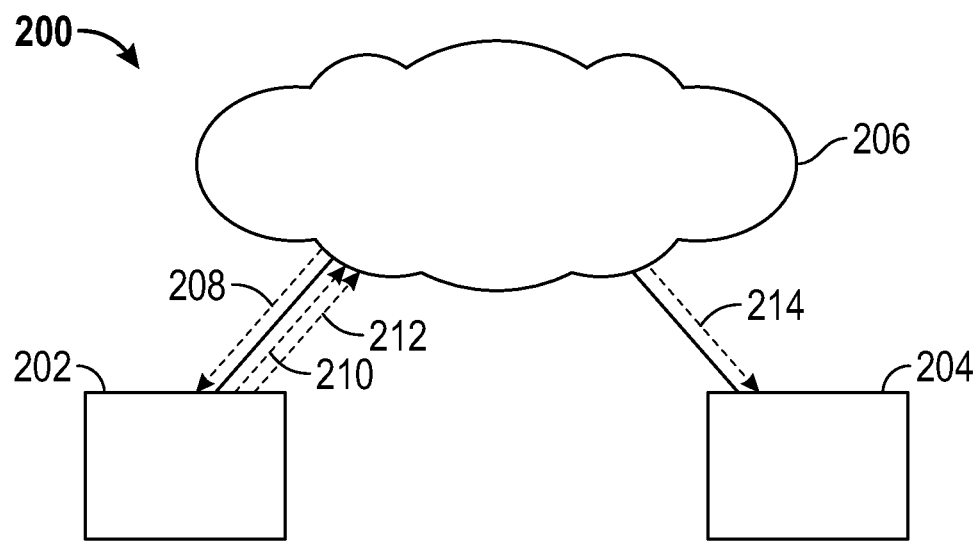
FIG. 2 is a schematic block diagram of a presently known cloud based file sharing scheme requiring manual uploading and synchronization of updated files.

FIG. 2 is a is a schematic block diagram of a cloud based file sharing system 200 which requires each updated file to be manually uploaded in order to synchronize the file with other devices. More particularly, system 200 includes a first computing device 202 (e.g., a desk top computer), a second computing device 204 (e.g., a tablet computer), and a cloud based file sharing service 206.

With continued reference to FIG. 2, when a user desires to update a shared file or other data object, the file may be downloaded from the cloud along arrow 208 (if the file to be updated does not already reside locally on the device 202). The user then updates, revised, augments, or otherwise manipulates the file. The updated file is then uploaded to the service cloud 206 along arrow 210. Typically, in order to facilitate subsequent sharing of the updated file with other users and/or devices, the user configures and uploads sharing information along arrow 212, for example in the form of user names, email addresses, or other suitable identifying indicia of the users and/or devices with which or to whom the user desires to share the updated data object.

Once the updated data object is saved in the cloud 206, an application running in the cloud 206 shares the updated file according to the sharing configuration previously uploaded (see arrow 212). For example, if device 204 is among the authorized shares, device 204 could then download the updated file from the cloud 206 along arrow 214. Those skilled in the art will appreciate that presently known synchronizing and sharing schemes typically require each updated file to be manually uploaded to the cloud and, in addition, the sharing details for the updated file must also be uploaded to the cloud to permit subsequent sharing of the updated (synchronized) file. This process is cumbersome, time consuming, and error prone.

Figure 3:
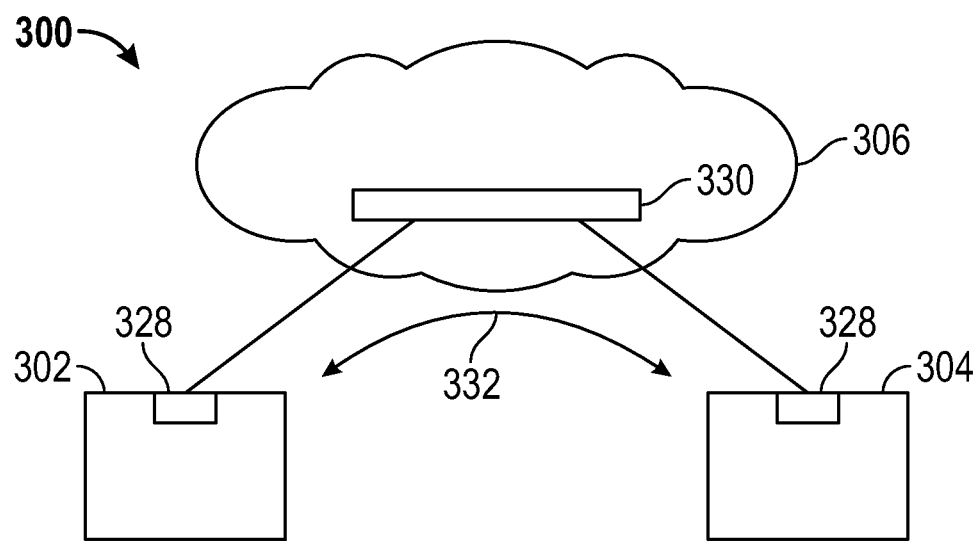
FIG. 3 is a schematic block diagram of a cloud based file synchronizing and sharing scheme implementing automatic uploading and sharing of updated files in accordance with an embodiment.

Referring now to FIG. 3, a schematic block diagram of a cloud based file synchronizing and sharing scheme implementing automatic uploading and sharing of updated files is shown. More particularly, a first computing device 302 and a second computing device 304 are configured to run a client application 328 for automatically synchronizing data objects with a service cloud 306 of the type configured to implement file synchronization and sharing application 330, for example in the context of one or more enterprise social networks. In an embodiment, service cloud 306 may operate in accordance with the Chatter collaboration solution, discussed above.

With continued reference to FIG. 3, once a data object is modified or otherwise manipulated using device 302, the synchronization application 328 automatically uploads the updated object to the cloud 306, without requiring additional action by the user. Once the updated object is received by the cloud 306, the object is seamlessly shared (synchronized) with the other authorized users and devices (including device 304), in accordance with previously configured social networking access controls, as described in greater detail below.

Figure 4:
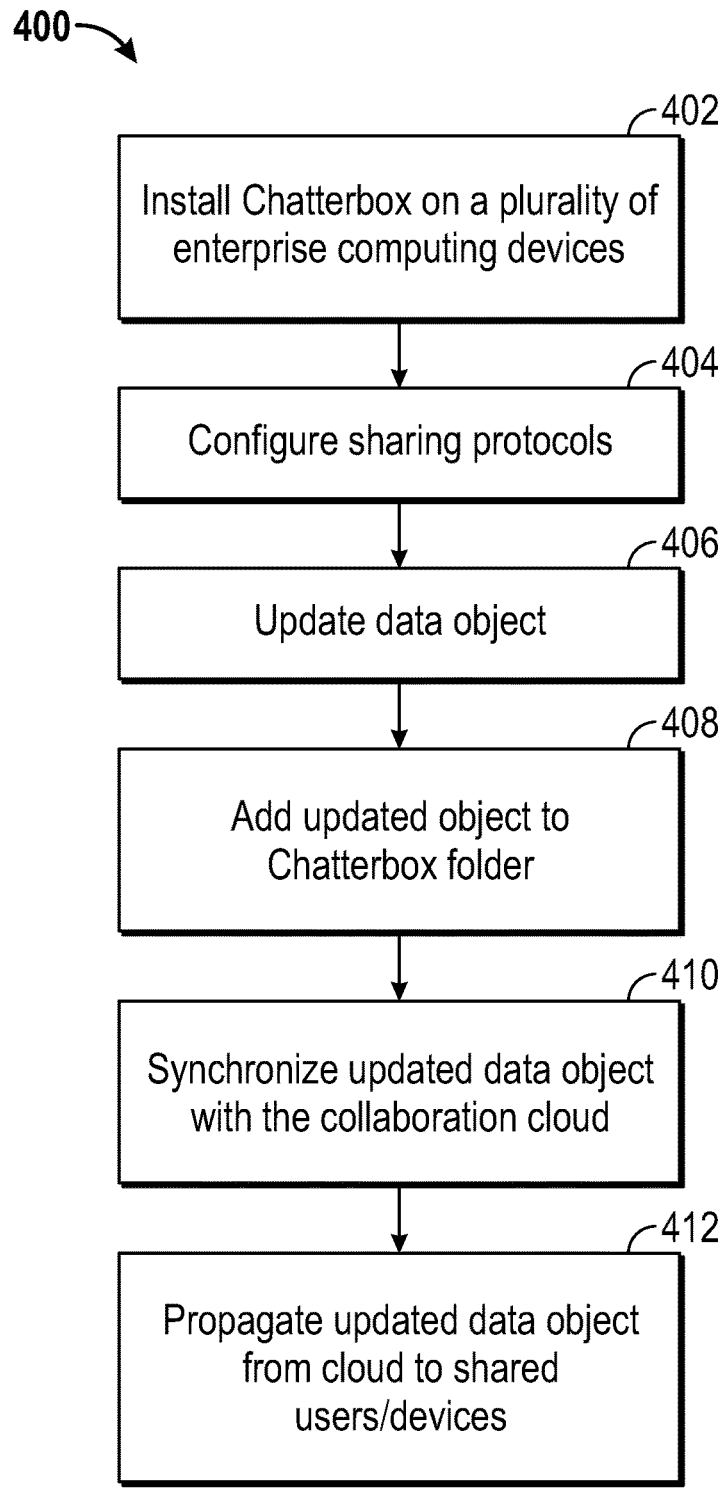
FIG. 4 is a flow chart illustrating an exemplary method of initially synchronizing and sharing a data object in accordance with an embodiment.

FIG. 4 is a high level flow chart illustrating an exemplary method 400 for initially synchronizing and sharing a data object in accordance with an embodiment. More particularly, the method 400 includes installing (Task 402) a file synchronizing client application on a plurality of computing devices. Method 400 further includes defining (Task 404) one or more sharing configurations for a user's social network profile using the enterprise platform. In an embodiment, this may involve identifying various devices, groups, and/or other users with whom files are to be shared.

Using a first one of the devices on which the file synchronizing client application is installed, a user creates (Task 406) a new object or modifies an existing object, either locally (i.e., off line) or via a web based portal which connects the first device to a Chatter-type collaboration cloud. Using a file manager application operatively associated with the aforementioned file synchronizing client application, the updated data object is added (Task 408) to a synchronization folder, i.e., a folder used for storing files which the user desires to synchronize with other users and/or devices, as described in greater detail below in conjunction with FIGS. 6-38.

Method 400 further includes synchronizing (Task 410) the updated data object with the service cloud, and automatically updating (Task 412) the data object on all shared devices.

Figure 5:
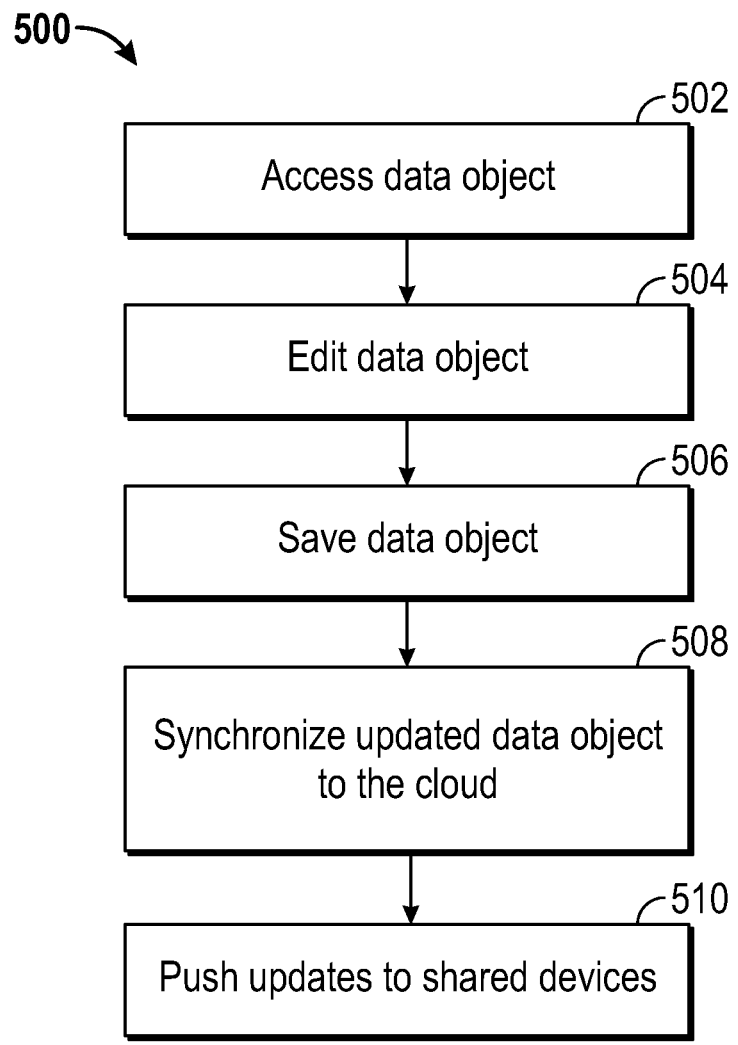
FIG. 5 is a flow chart illustrating an exemplary method of updating and sharing a data object previously configured for automatic synchronization in accordance with an embodiment.

FIG. 5 is a flow chart illustrating an exemplary method 500 of synchronizing and sharing a data object which was previously configured for automatic synchronization, for example as shown in FIG. 4. In particular, the method 500 includes accessing or opening (Task 502) a data object which the user desires to update, synchronize, and share. The object may be accessed locally or downloaded from the cloud via a web based portal. The data object is then edited, updated, or otherwise manipulated (Task 504) by the user, and then saved (Task 506), indicating that editing is complete (at least temporarily).

With continued reference to FIG. 5, method 500 further includes automatically synchronizing (Task 508) the updated device to the cloud, and pushing (Task 510) the updates to the shared users and/or devices.

Figure 6:
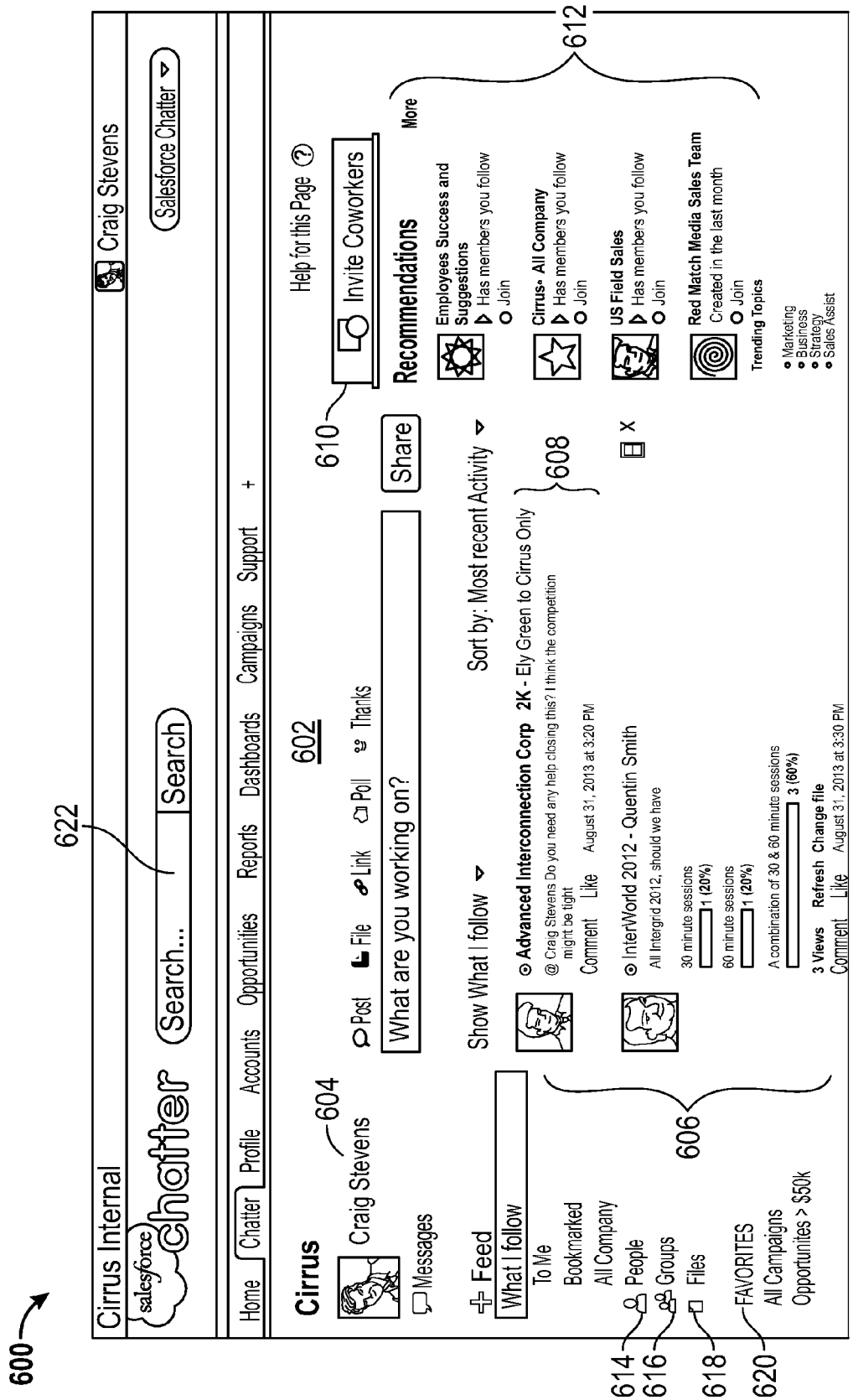

FIGS. 6-10 are exemplary screen shots illustrating various aspects of an on line social networking environment in accordance with various an embodiments. More particularly, FIG. 6 is a screen shot 600 of a profile for a particular member 604 of an enterprise social network. The profile 602 includes a feed 606, including one or more "opportunities" which, as used herein, corresponds to a sales prospect, marketing project, or other business related activity with respect to which the member 604 desires to collaborate with others.

With continued reference to FIG. 6, profile 602 also includes an invite co-workers icon 610, a recommendations section 612, a people section 614, a groups section 616, a files section 618, a favorites section 620, and a search feature 622.

Figure 7:
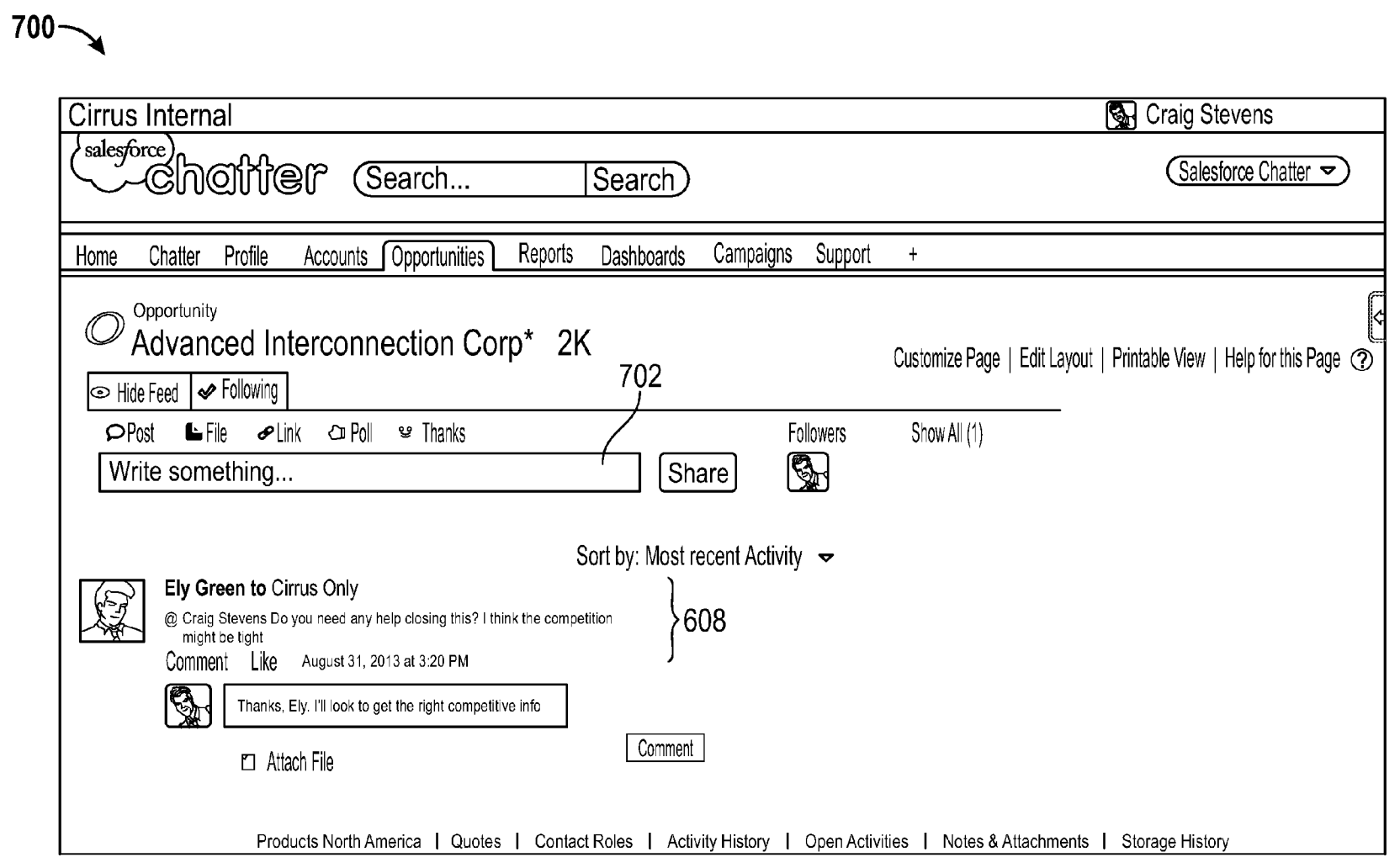

FIG. 7 is an exemplary screen shot 700 illustrating an expanded view of opportunity 608. In particular, screen shot 700 illustrates a messaging feature 702 which the user may use to send messages to co-workers regarding the status of opportunity 608.

Figure 8:
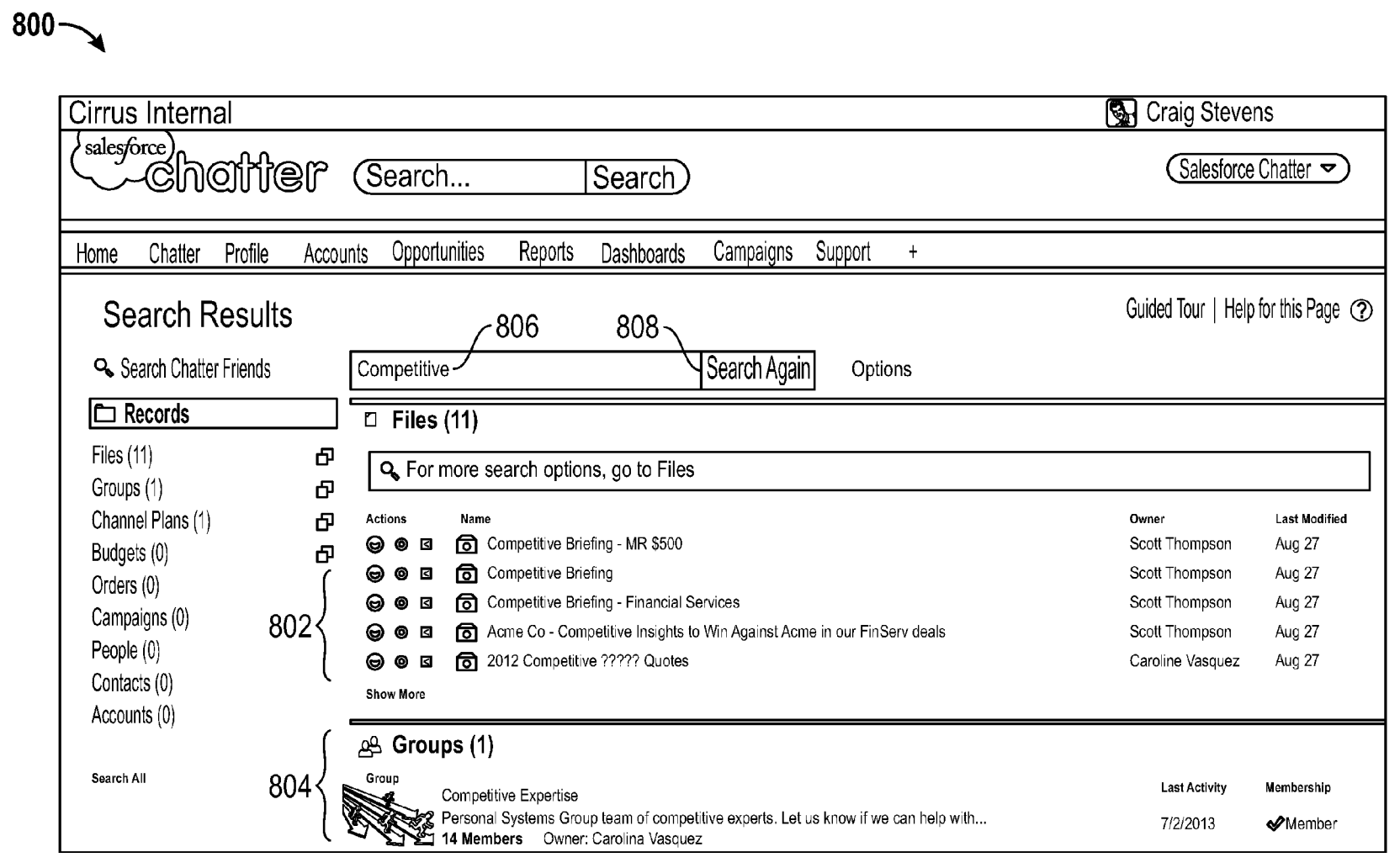

FIG. 8 is an exemplary screen shot 800 illustrating an expanded view of the search feature, showing a first category 802 of search results (files) and a second category 804 of search results (groups) for the search term 806 (the word "competitive" in the illustrated example) entered onto a search box 808.

Figure 9:
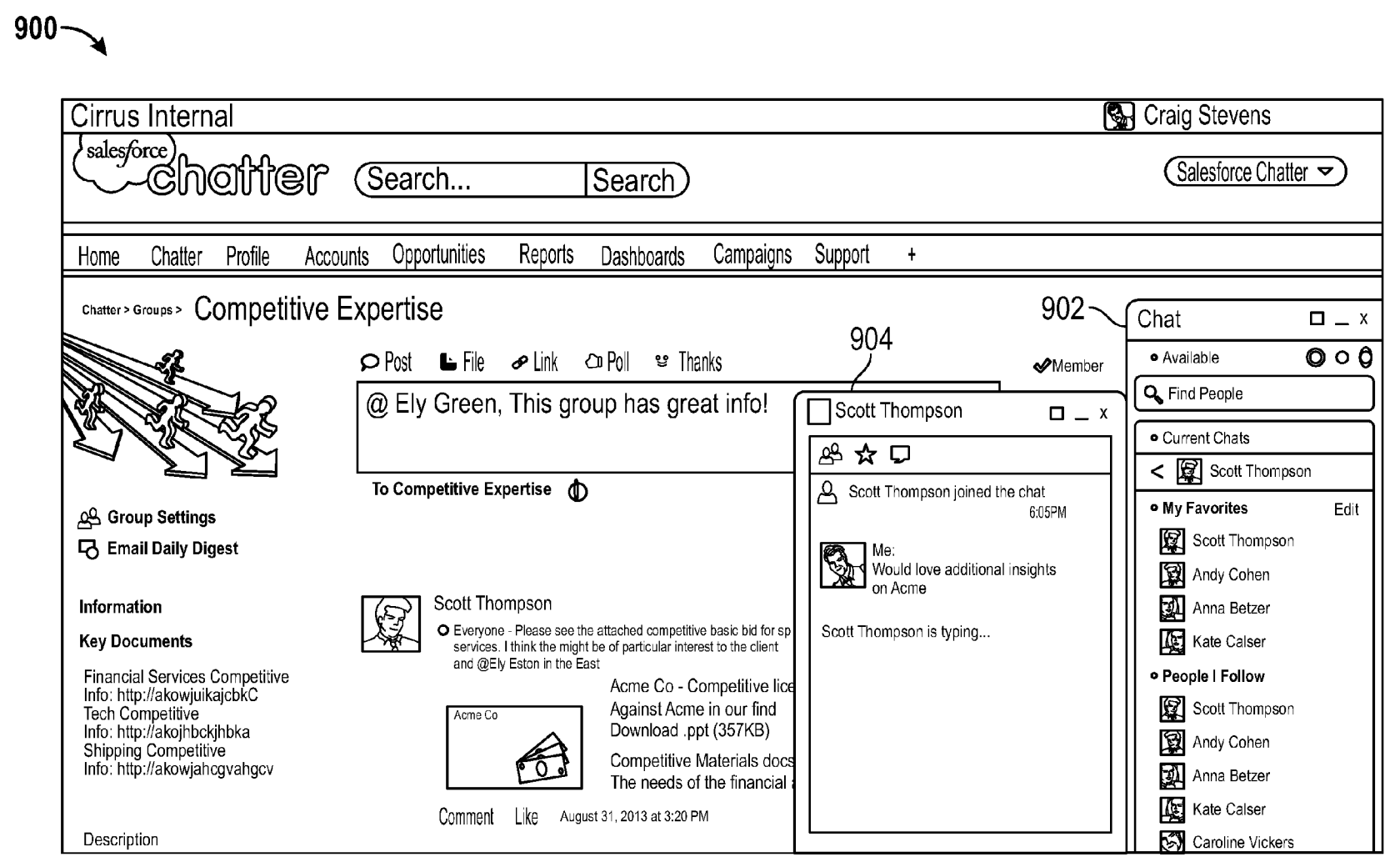

FIG. 9 is an exemplary screen shot 900 illustrating an expanded view of a chat feature, showing a live conversation 904 with another user selected from a current chat menu 902.

FIG. 10 is an exemplary screen shot 1000 illustrating a detail view of a selected opportunity 1002, showing a system information section 1004 and an activity history section 1006 for the selected opportunity.

Figure 11:
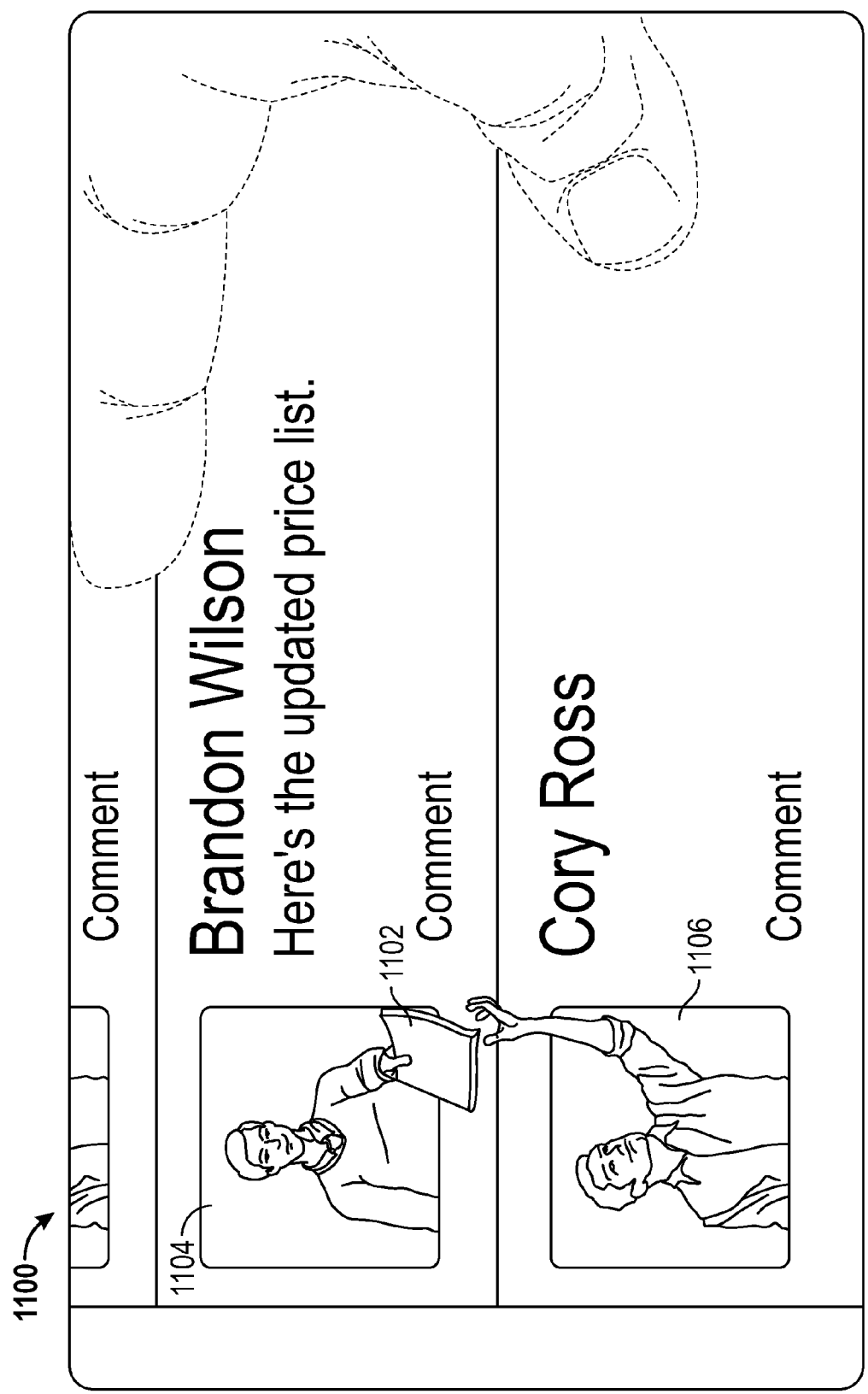
FIG. 11 is a graphical metaphor illustrating real time seamless synchronizing and sharing of a data object in accordance with an embodiment.

By accessing, editing, synchronizing, and sharing various data objects within a profile using the file synchronization and sharing techniques described herein, collaboration may be significantly enhanced. FIG. 11 is a screen shot 1100 illustrating a graphical metaphor for real time seamless synchronizing and sharing of a data object in accordance with an embodiment. More particularly, screen shot 100 depicts a data object 1102 being seamlessly propagated to a second user 1106 after having been updated by a first user 1104 in accordance with the present disclosure.

Figure 12:
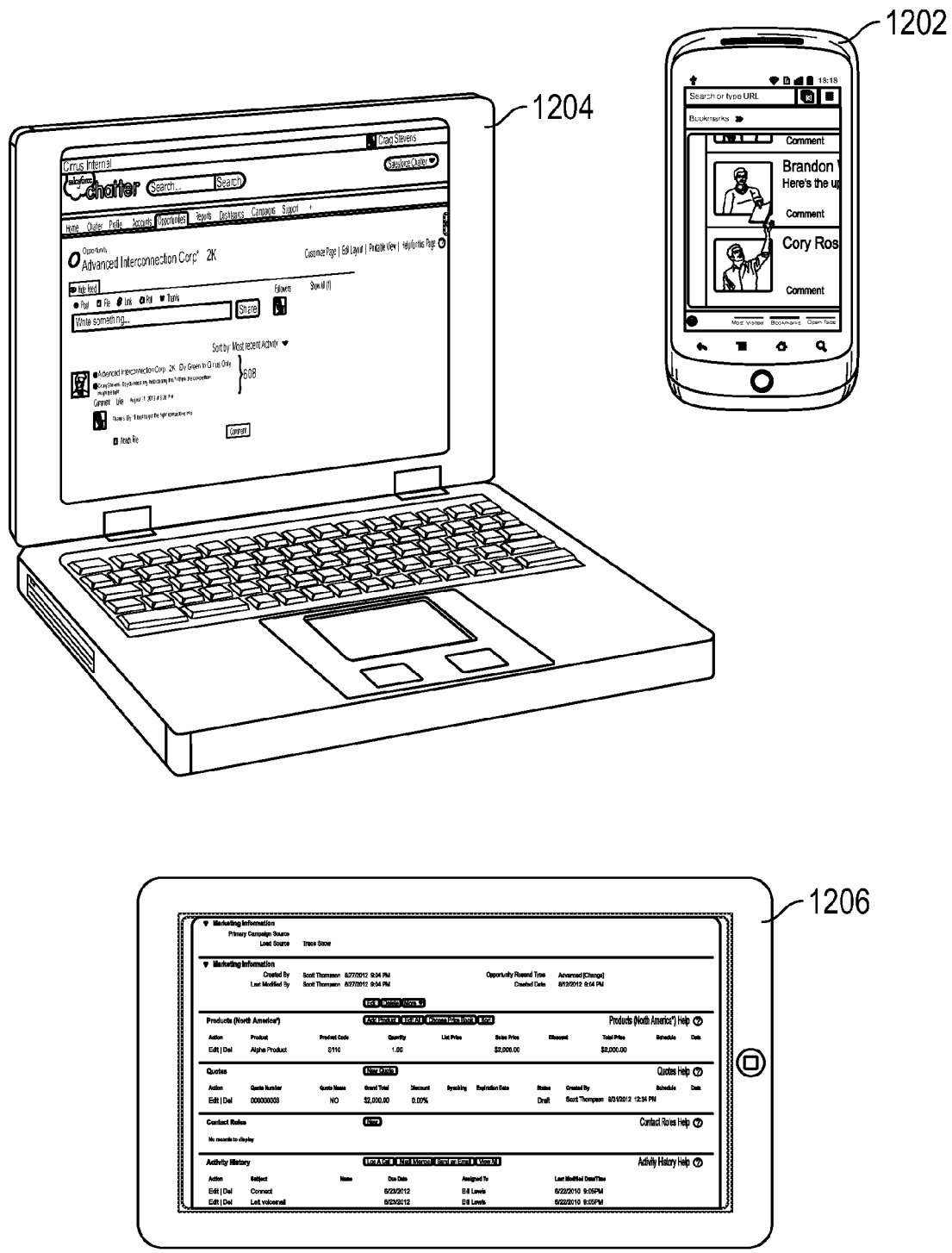
FIG. 12 is a side-by-side comparison of various computing devices displaying an exemplary on line social networking environment across different operating systems in accordance with an embodiment.

In an embodiment, the file synchronizing and sharing techniques described herein may be implemented by any number of shared devices across various operating systems and device platforms. FIG. 12 is a side-by-side comparison of various computing devices displaying an exemplary on line social networking environment across different operating systems. In particular, FIG. 12 shows a smartphone 1202, a desk top computer 1204, and a tablet computer 1206 each displaying a respective version of the social networking environment optimized for the device. By coordinating the enterprise social networking environment across various computing device this way, synchronized data objects may be seamlessly accessed by different devices using familiar navigational features, as described in greater detail below.

Figure 13:
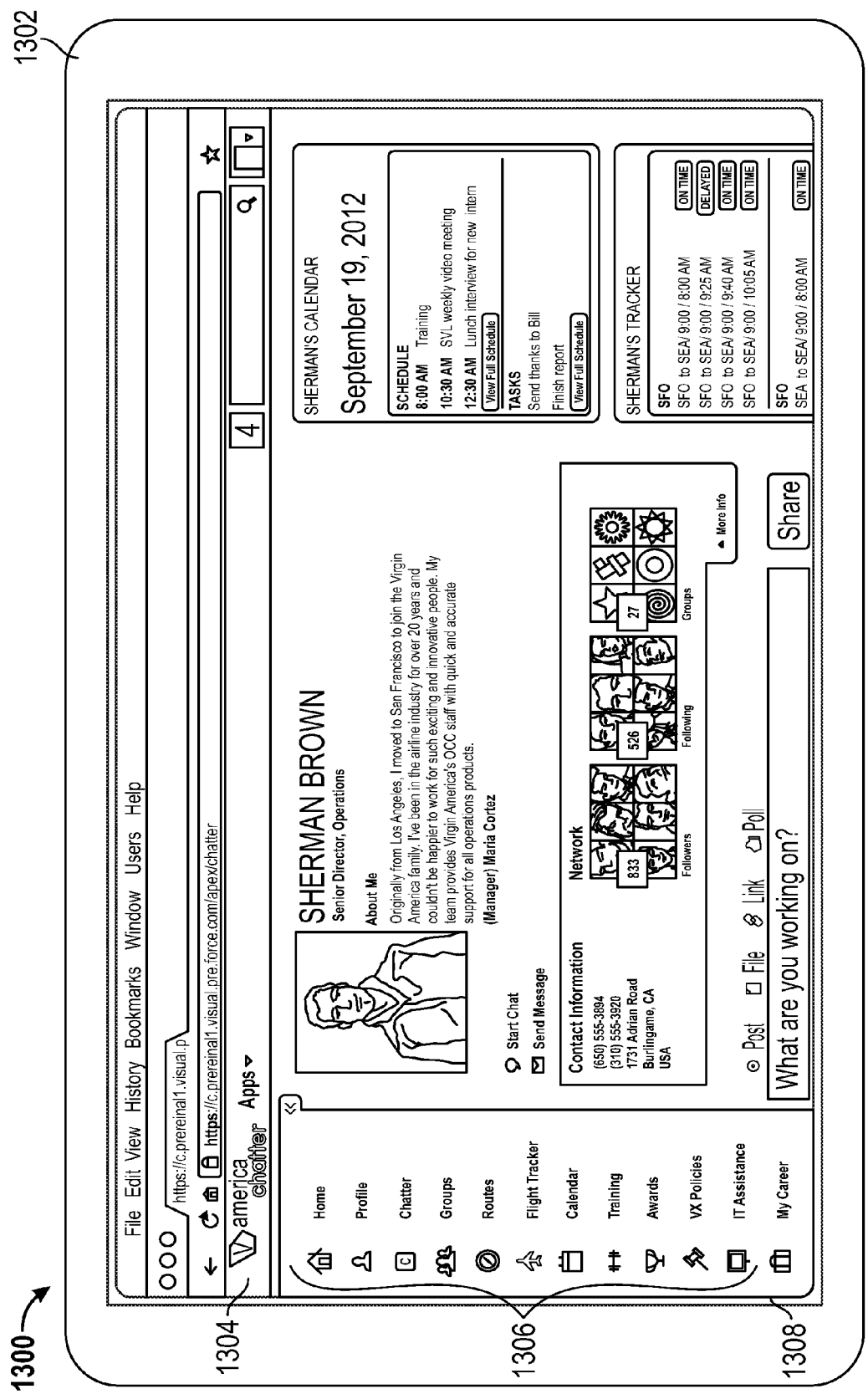
FIG. 13 is a screen shot of an exemplary enterprise social networking web page using a customizable platform in accordance with an embodiment.

Moreover, by providing a customizable user interface platform for file synchronizing and sharing within an enterprise, each organization (tenant) may utilize the features described herein while maintaining a consistent corporate identity. By way of non-limiting example, FIG. 13 is a screen shot 1300 of an exemplary enterprise social networking web page 1302 using a customizable platform in accordance with an embodiment. Web page 1302 may be customized to include a company logo 1304, organization specific files, applications, and features 1306, and a desired color scheme 1308.

FIGS. 14-20 are screen shots illustrating various features of an automatic file synchronizing and sharing application in a desk top environment in accordance with various embodiments.

Figure 14:
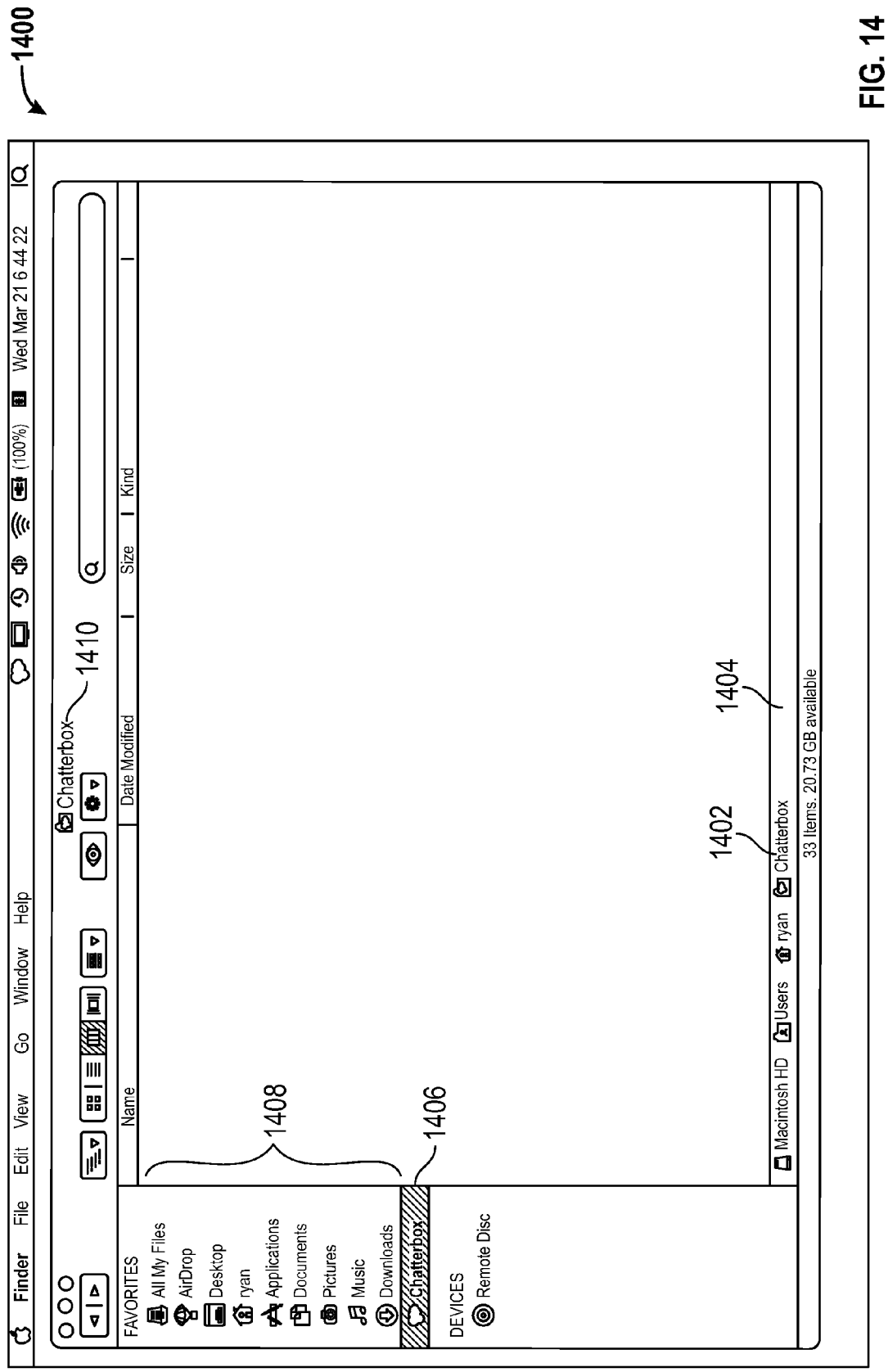
FIGS. 14-20 are screen shots illustrating various features of an automatic file synchronizing and sharing application in a desk top environment accordance with various embodiments.
Figure 15:
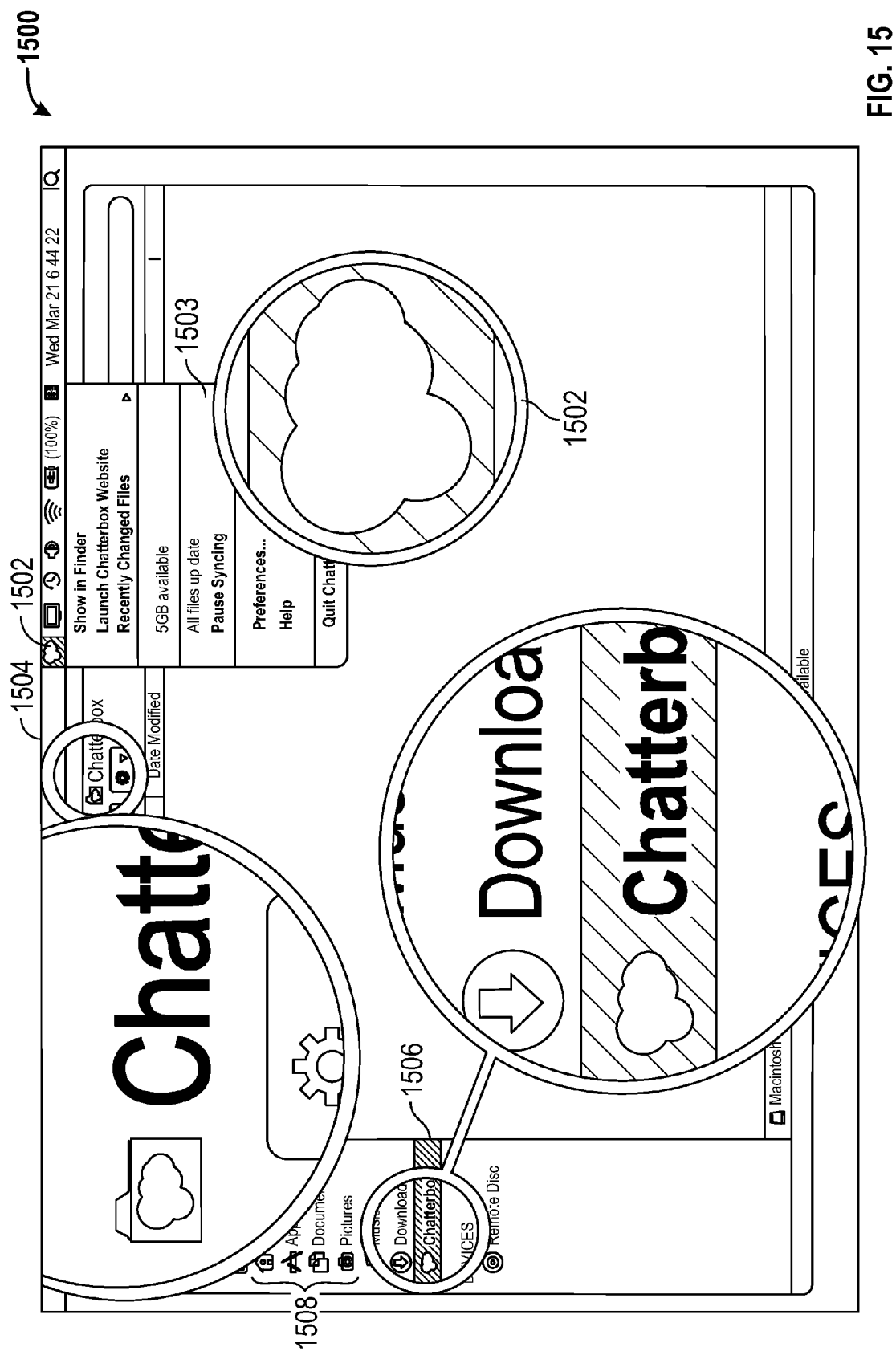

More particularly, FIG. 14 is a screen shot 1400 illustrating a Mac operating system look and feel for a desk top version implementation of a file synchronizing and sharing application. in particular, screen shot 1400 includes a Chatterbox icon 1402 in a system tray 1404, a Chatterbox folder 1406 in a favorites menu 1408, a Chatterbox navigation icon 1410 disposed near the top center of the desk top, and a cloud icon FIG. 15 is a screen shot 1500 of the desk top of FIG. 14, expanding and highlighting various Chatterbox features. Specifically, a Chatterbox cloud icon 1502 is shown with an associated drop down menu 1503 for communicating status, storage, and preferences information. Screen shot 1500 also includes a Chatterbox filter 1506 in the finder favorites bar 1508.

Figure 16:
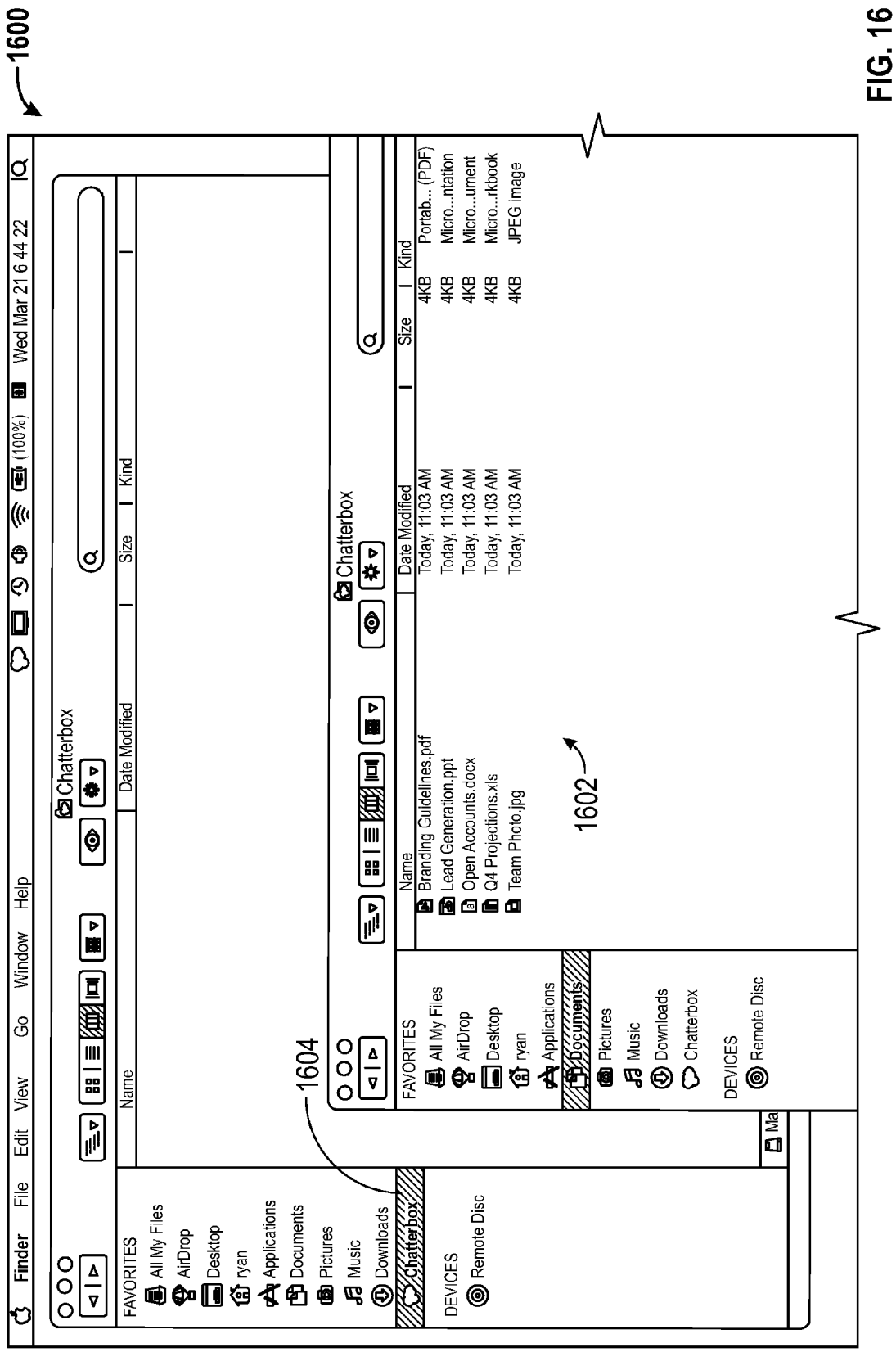
Figure 17:
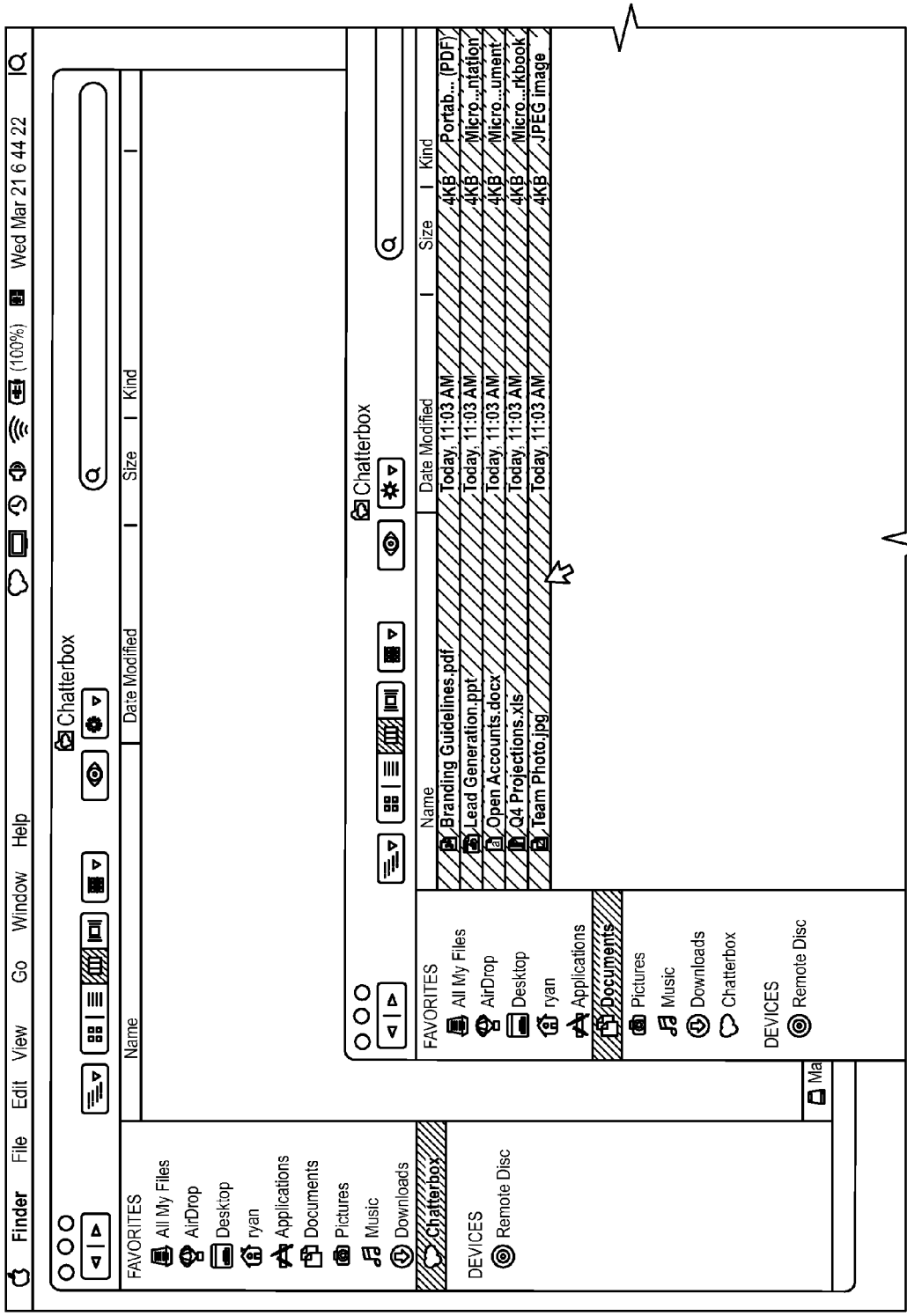

FIG. 16 is a screen shot 1600 showing the contents 1602 of documents folder overlaid on the desk top of FIG. 14. In an embodiment, a file or other data object may be added to the Chatterbox folder 1604 by dragging and dropping, right clicking the file and selecting the "Chatterbox" folder, or in any other convenient fashion. For example, FIG. 17 shows a screen shot 1700 illustrating a technique for highlighting a group of files and dragging them into the Chatterbox folder using native file system interaction.

Figure 18:
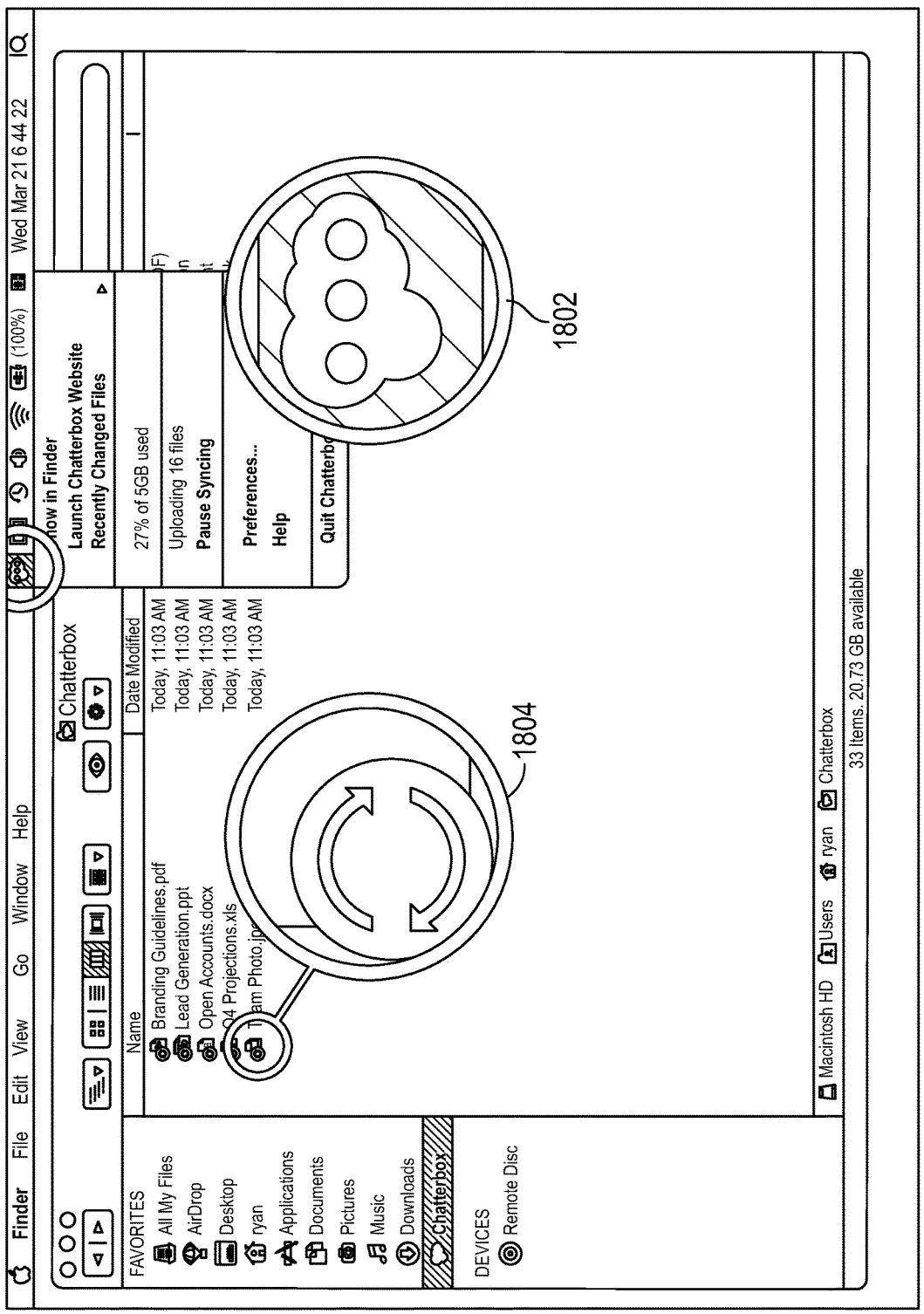

FIG. 18 is a screen shot 1800 illustrating the syncing of files to the user in two ways: i) by using an animated Chatterbox icon 1802 in the menu bar; and ii) by overlaying a syncing icon 1804 at the file level for each file being synced.

Figure 19:
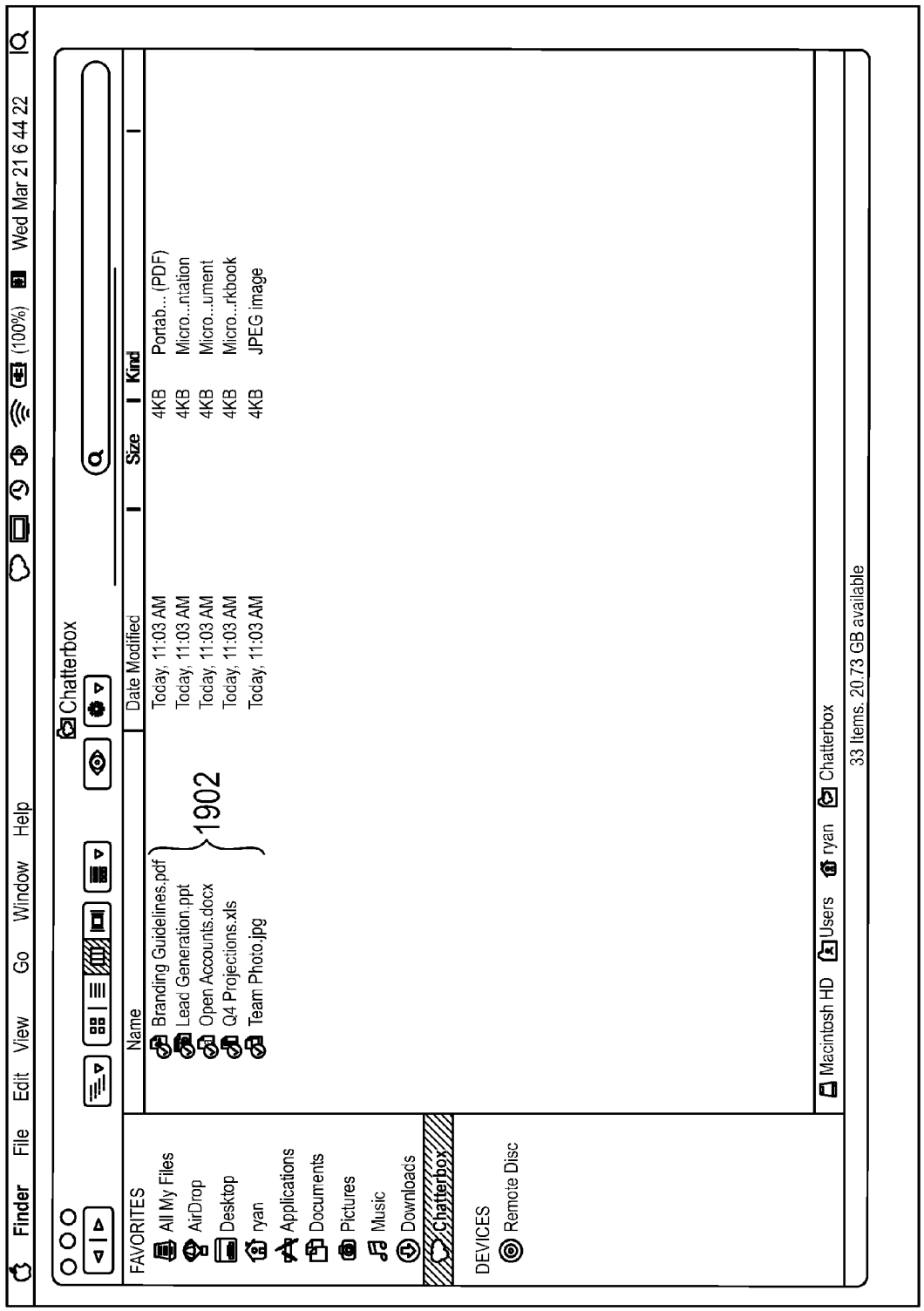

FIG. 19 is a screen shot 1900 displaying status overlay icons 1902 having check marks, indicating that the files have updated (synchronized) in the cloud.

Figure 20:
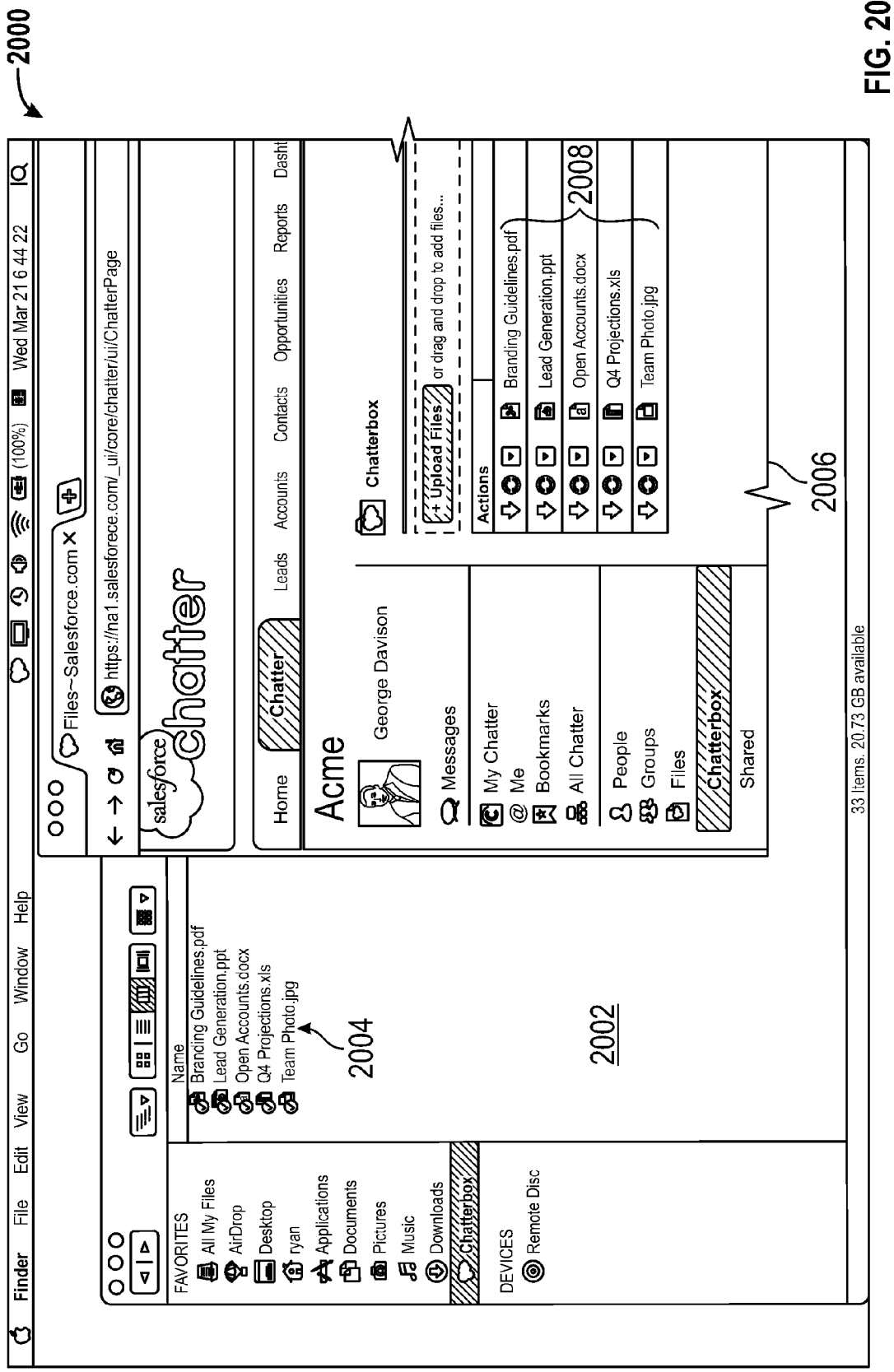

FIG. 20 is a screen shot 2000 illustrating the local file system (the desk top environment) 2002 showing the Chatterbox files 2004, mirrored against the Chatter (web browser) view 2006 of the files list 2008. Note that after syncing is complete, both the local and the web based views of the Chatterbox folder contain the same list of files.

In accordance with an embodiment, notifications may be used to let users know that data/files have been synchronized. Because files are automatically synchronized, it will not always be clear that a file has changed, particularly in the case where the data/file is shared with others. Therefore, notifications may be employed across all platforms, including mobile, desktop, and web clients. These notifications advise the user that there has been an update and guide the user to the changed data/file. Notifications can also be accessed through an API to automatically drive external applications. Moreover, while one example of syncing surrounds the addition of a new file, other activities can also trigger an automatic update, for example the deletion or modification of data/files, or a change to metadata such as a timestamp change, the addition of notes, or the like.

Automatic synchronizing and sharing can also be integrated with a wide range of functionality including business processes, email, and external systems. Business process integration involves integrating the syncing function with work flows, approvals, tasks, and any other business process metric. Email integration may involve syncing/sharing through email, and automatically syncing/sharing when an email attachment is replaced, updated, or otherwise manipulated. External system integration involves syncing/sharing when a file or data is added to an external repository, such as the Documentum store.

Figure 21:
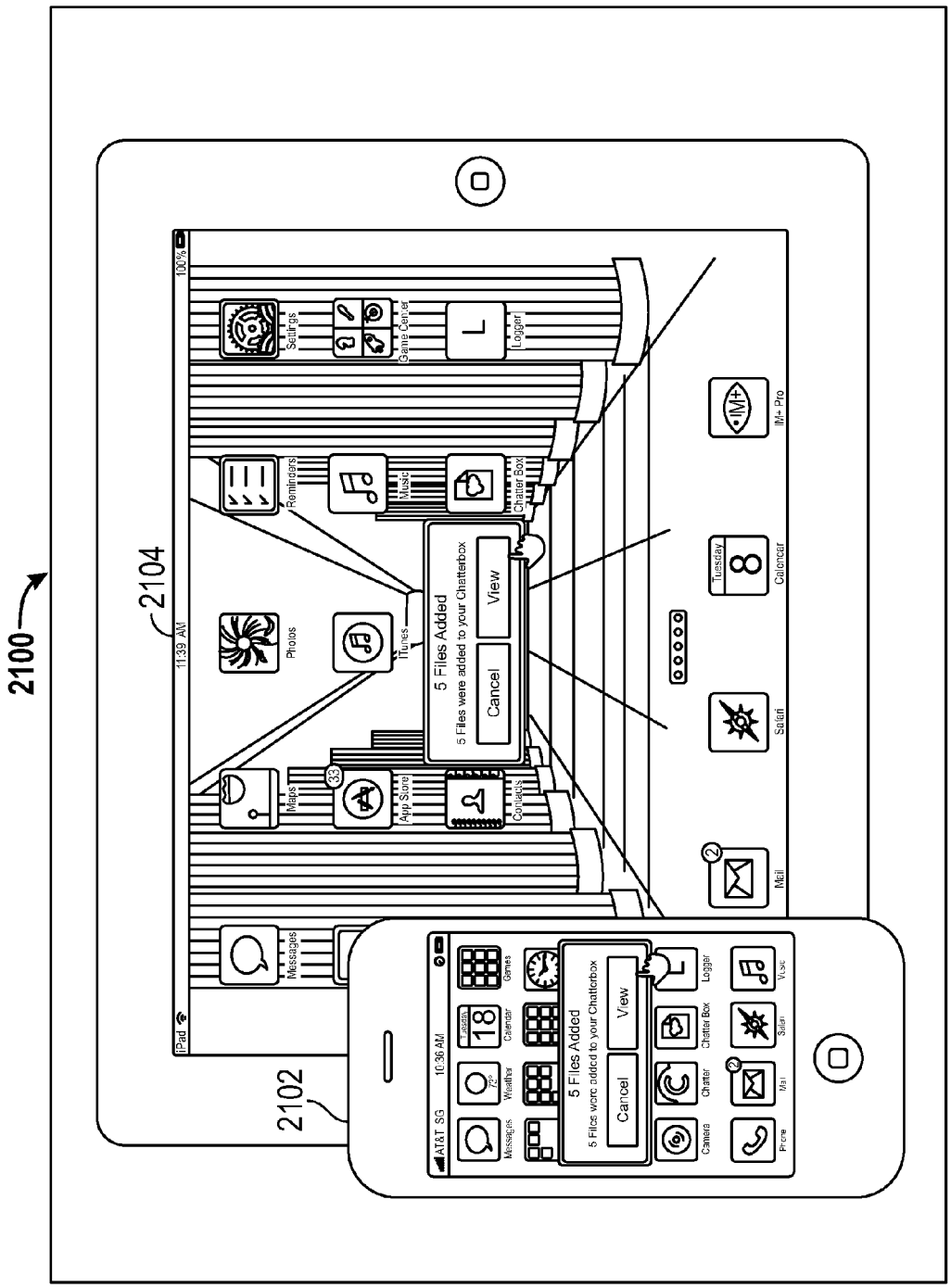
FIGS. 21-27 are screen shots illustrating various functional attributes of an automatic file synchronizing and sharing application in a mobile computing environment in accordance with various embodiments.

FIGS. 21-27 are screen shots illustrating various functional attributes of an automatic file synchronizing and sharing application in a mobile computing environment in accordance with various embodiments. More particularly, FIG. 21 is a screen shot 2100 showing an iOS user interface on an iPhone 201 juxtaposed with a mobile user interface on a tablet 2104. Each device is displaying a "push" notification associated with an event related to the aforementioned Chatterbox functionality. It should be noted that clicking on the notification takes the user directly to the list of files, and highlights the changed files.

In addition to the desk top environment discussed above in connection with FIGS. 14-20, there are a number of other ways in which files can be added to the Chatterbox folder from the web based portal, mobile devices, and from the broader Chatter environment, as will now be discussed.

Figure 22:
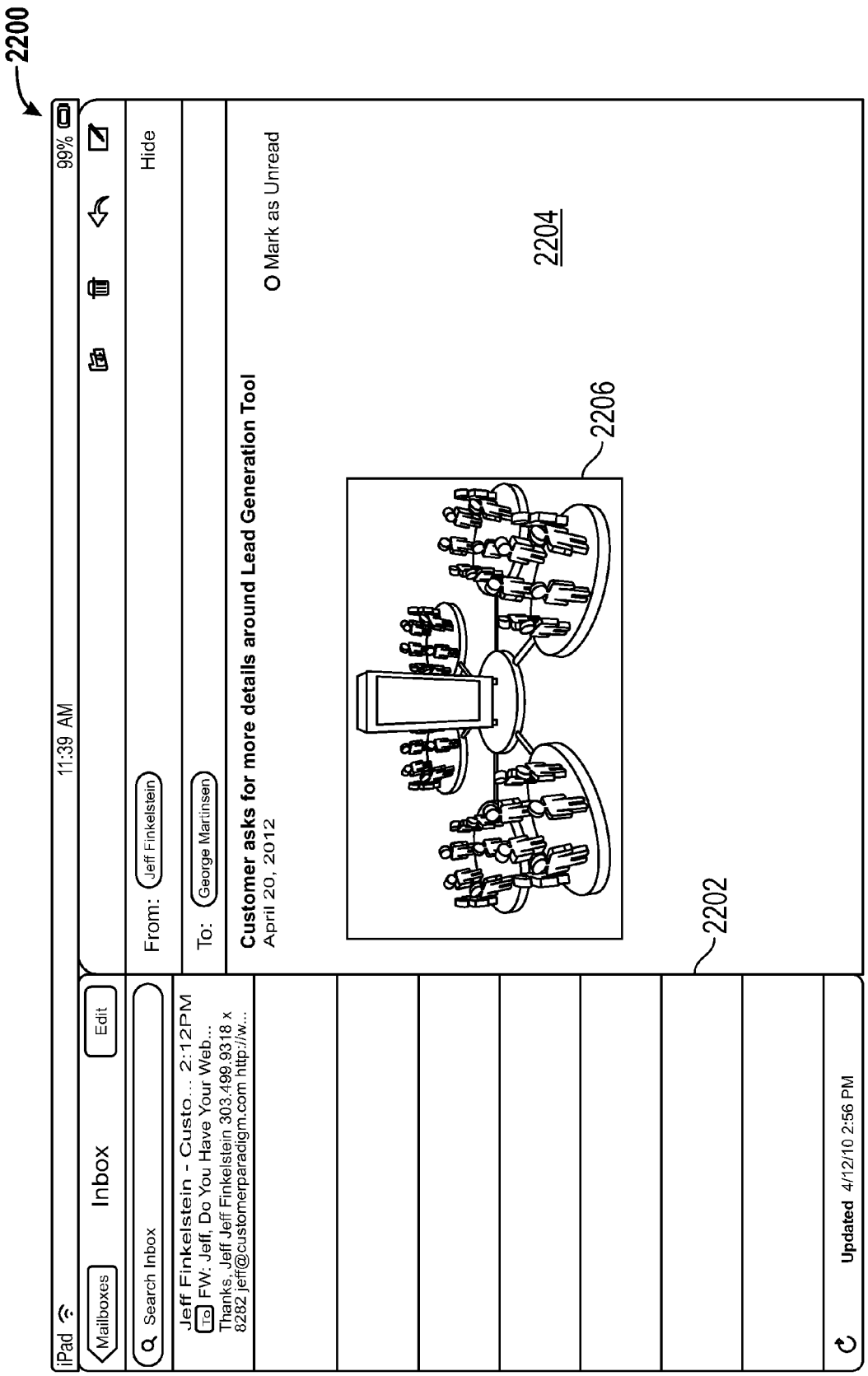
Figure 23:
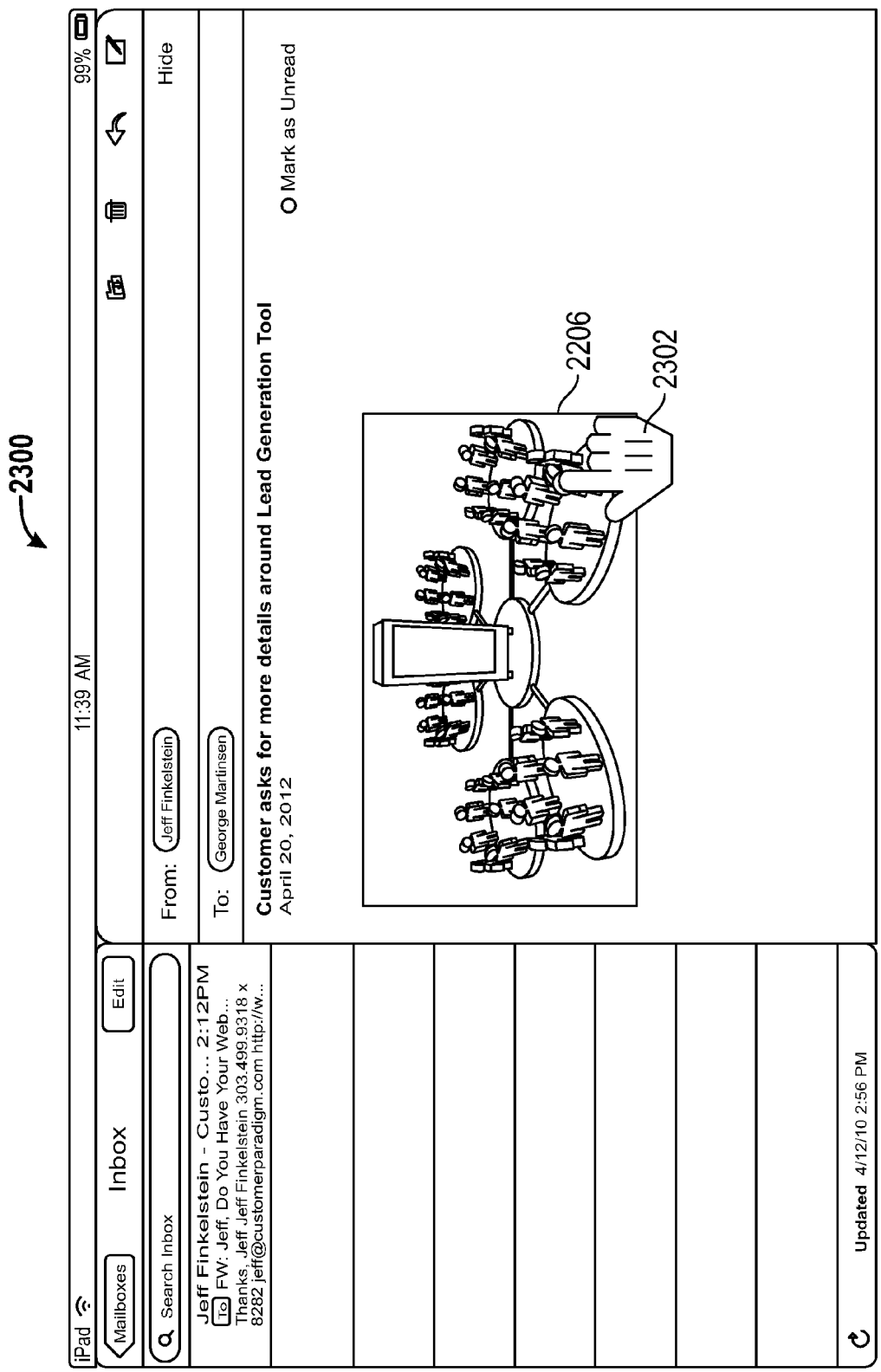

FIG. 22 is a screen shot 2200 of an iPad user interface, showing an email folder 2202 on the left and a selected email 2204 on the right including a Powerpoint™ presentation 2206 as an attachment. FIG. 23 is a screen shot 2300 showing a long press 2302 on the attachment 2206 to reveal context specific options.

Figure 24:
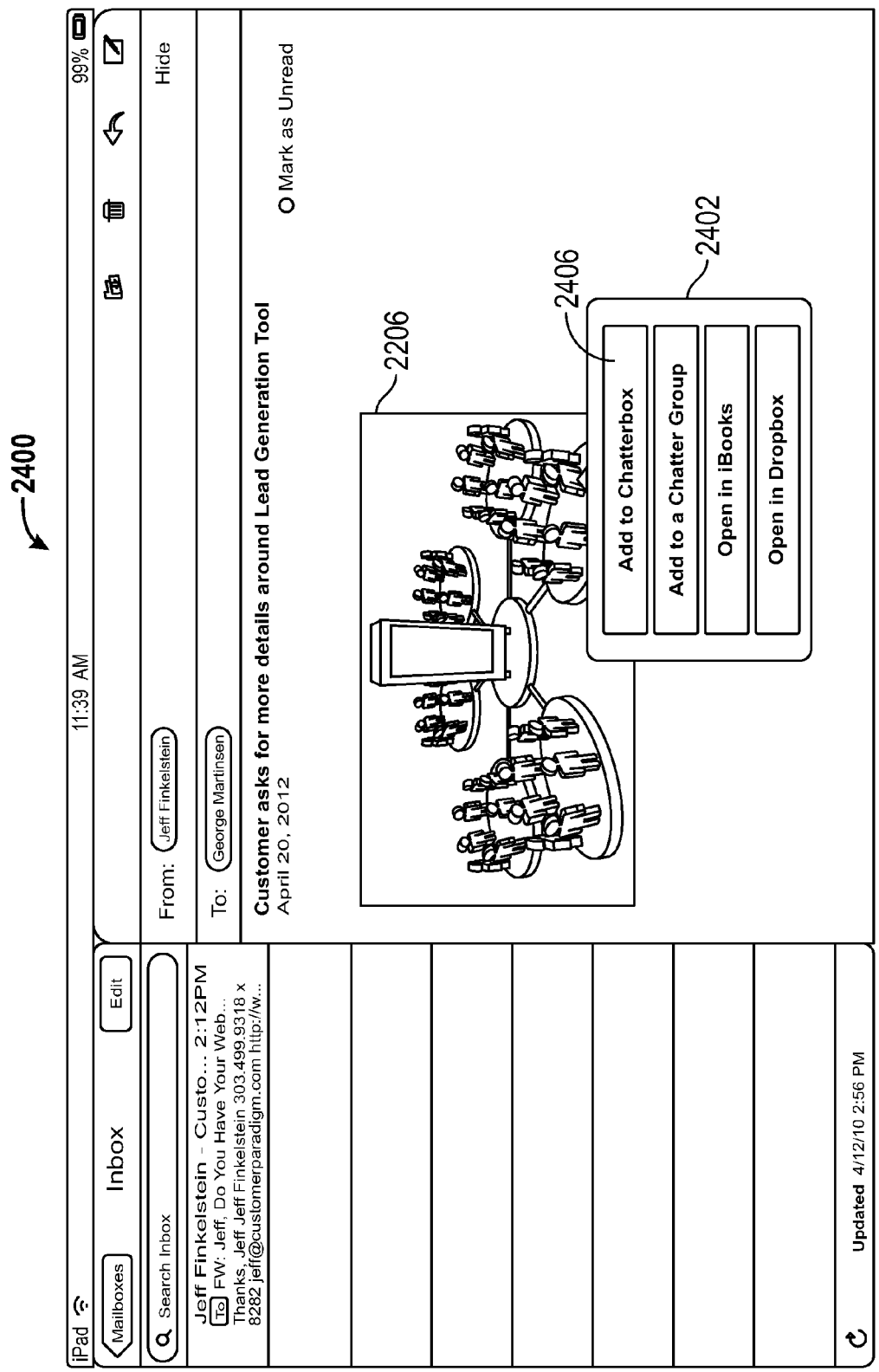
Figure 25:
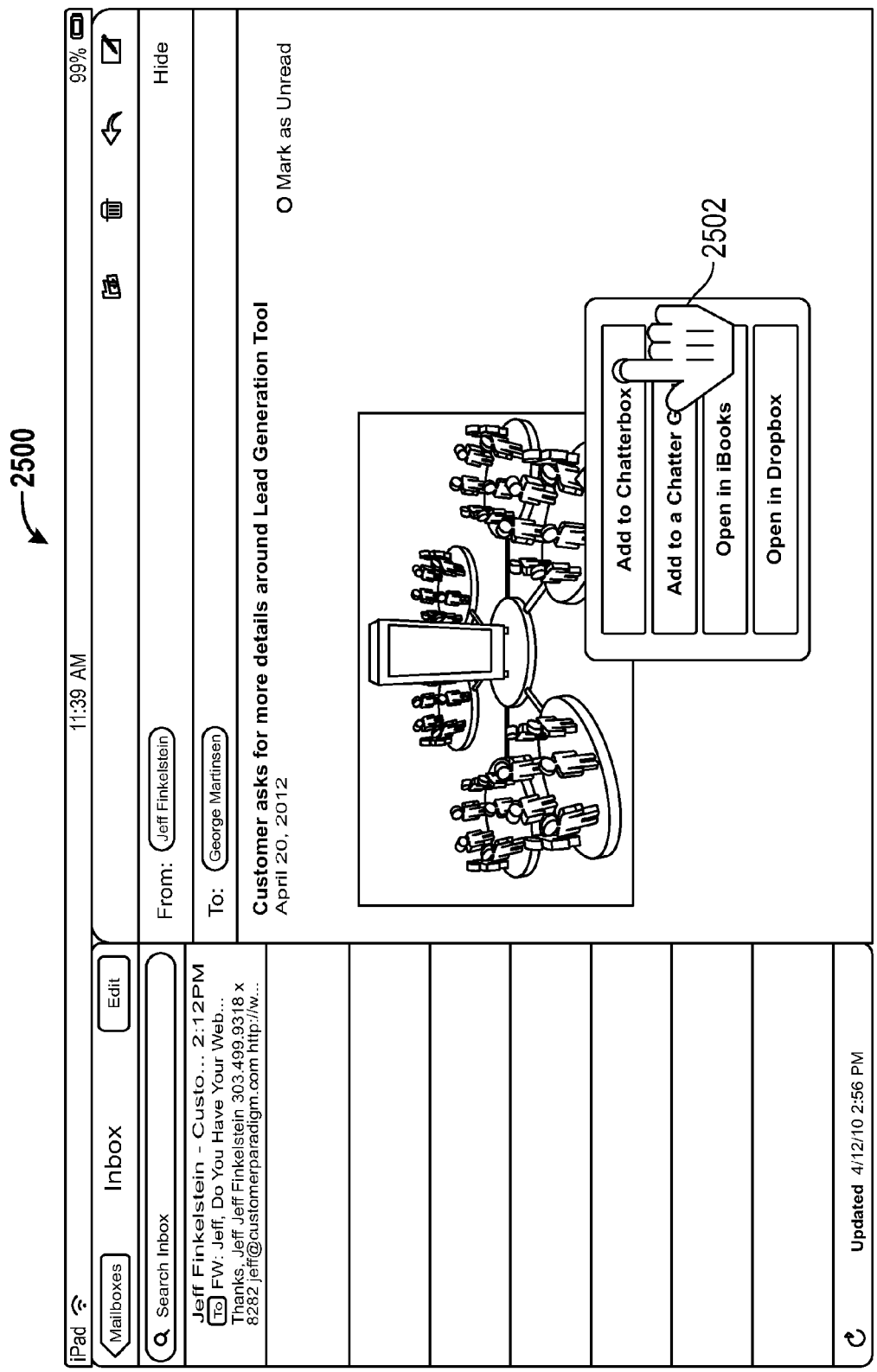
Figure 26:
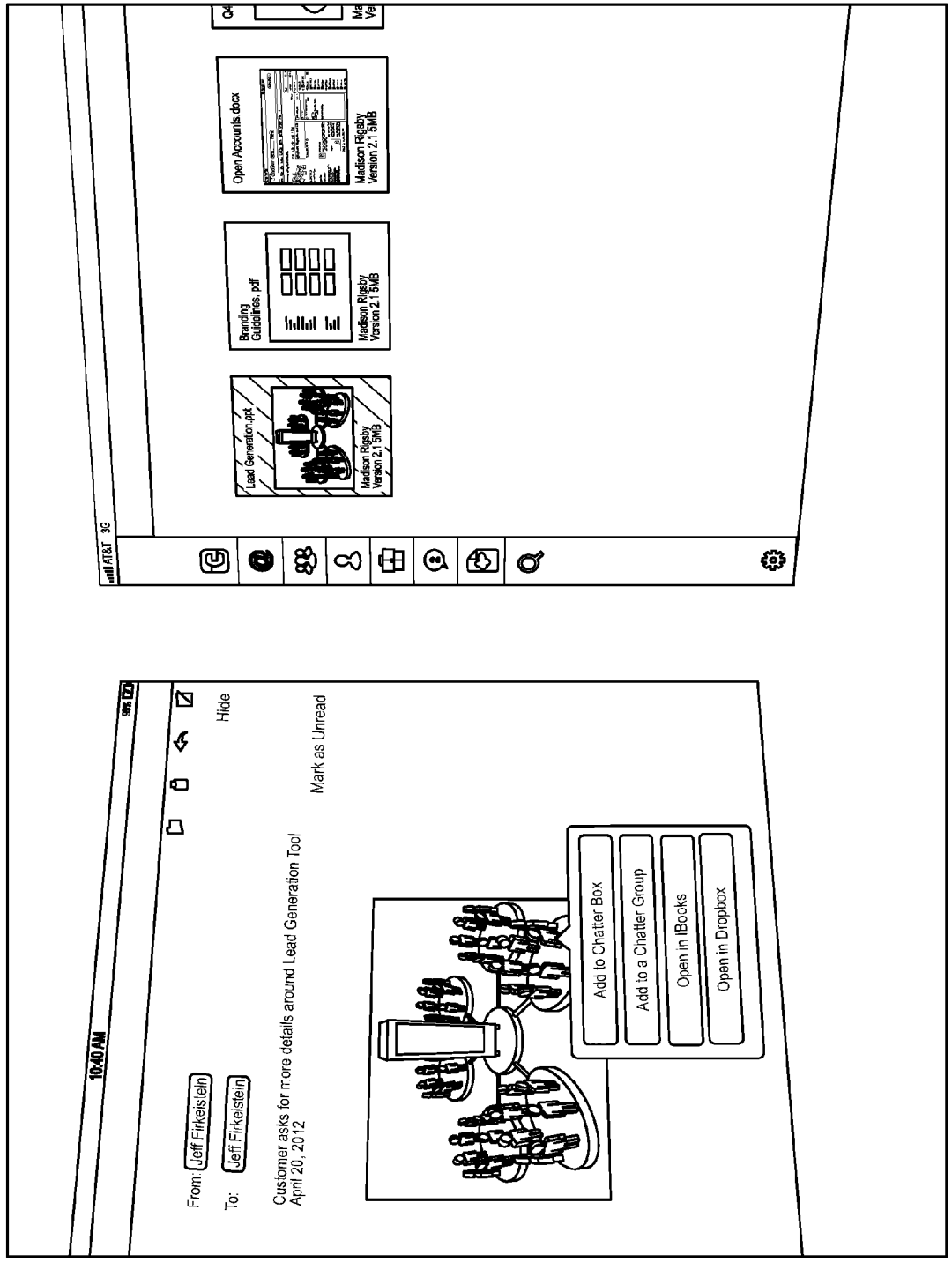
Figure 27:
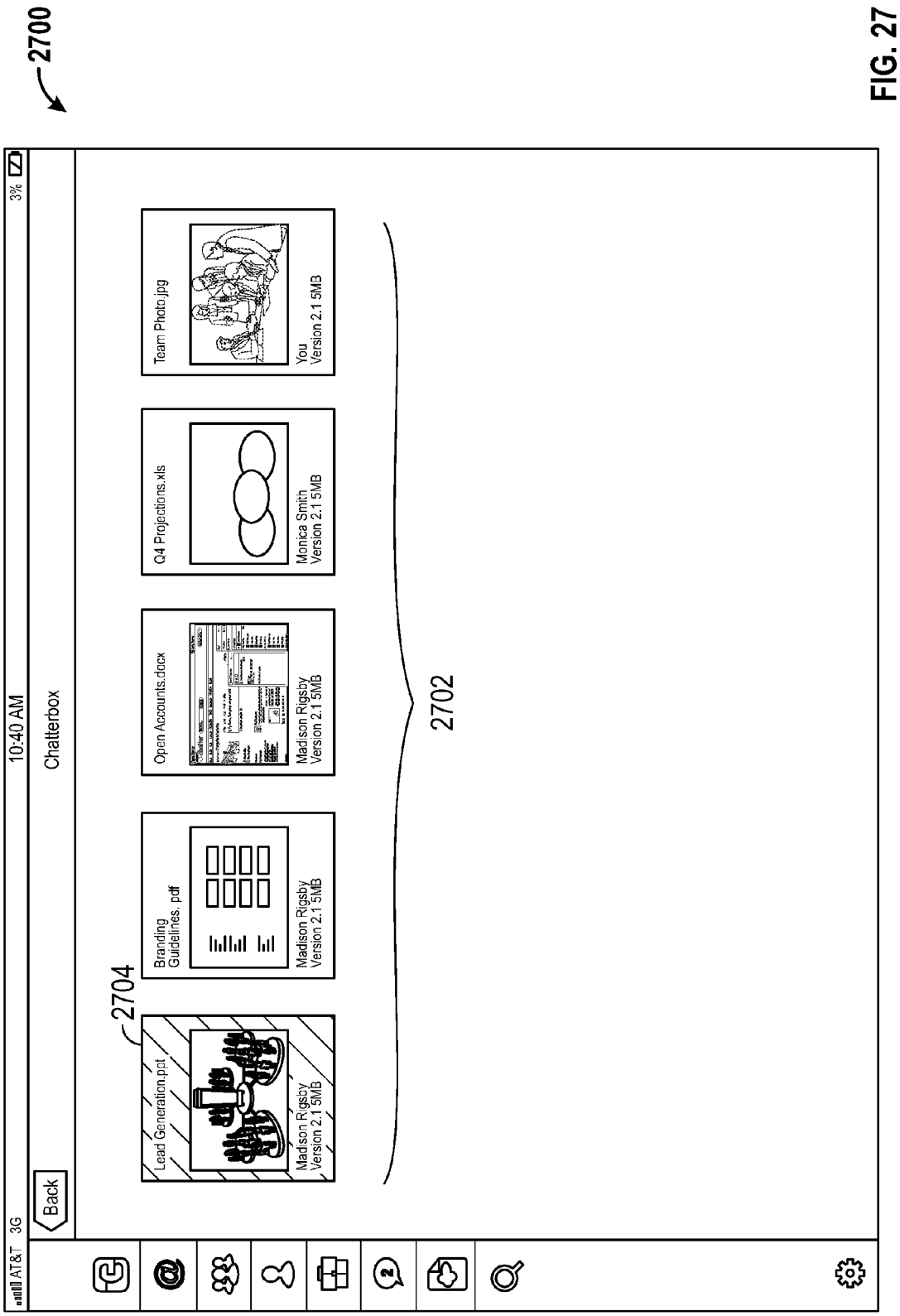

More particularly, FIG. 24 is a screen shot 2400 illustrating a menu 2402 including an "Add to Chatterbox" option 2406. FIG. 25 is a screen shot 2500 illustrating the user selecting 2502 the "Add to Chatterbox" option 2406 which, when selected by the user, adds the presentation attachment 2206 to the Chatterbox folder. In the illustrated example, once the object is added to the Chatterbox folder, the application switches to the Chatter view 2602 shown in FIG. 26. FIG. 27 is a screen shot 2700 illustrating the Chatter view of the files 2702 currently in the Chatterbox folder, with the most recently added file 2704 highlighted.

FIGS. 28-38 are screen shots illustrating various techniques for adding objects to a file synchronizing and sharing folder from other sources in accordance with various embodiments. In particular, FIG. 28 is a screen shot 2800 illustrating an exemplary feed 2802 within the profile of a user 2804. Specifically, a colleague 2806 has posted a file 2808 picked up by the feed 2802, and the user 2804 desires to save the file and make it available across the user's other devices. Accordingly, the user presses 2808 the "add to Chatterbox" option 2810, thereby adding the file 2808 to the Chatterbox folder directly from the feed post. With momentary reference to FIG. 29, a screen shot 2900 shows a desk top notification 2902 indicating that the file was added to the Chatterbox folder. In addition, the status indicator "In Chatterbox" 2904 also confirms that the file entitled "Conference Pricing" was added to the Chatterbox folder.

Figure 30:

FIG. 30 is a screen shot 3000 showing a view from the web based Chatter environment including a list 3002 of files contained within a particular user's 3006 Chatter profile. A status column 3004 indicated which files are in, and which files are not in, the Chatterbox folder. Specifically, those files having a solid circle 3008 next to the file name (column 3004) are already in the Chatterbox folder; those files marked with an open circle 3010 are not in the Chatterbox folder. This allows the user to quickly determine at a glance which files the user may wish to add to the Chatterbox folder.

Figure 31:
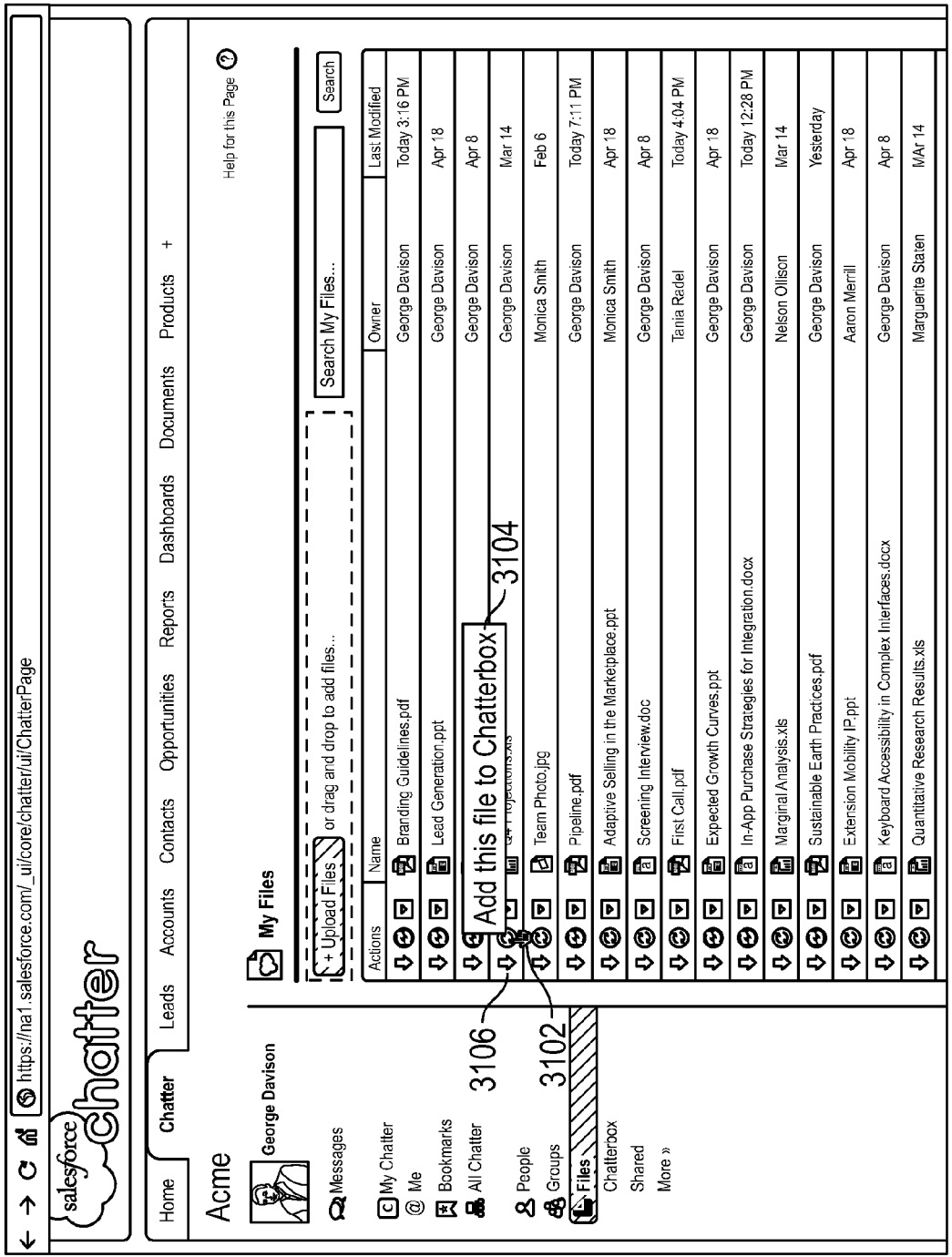

FIG. 31 is a screen shot 3100 of the Chatter environment showing the user hovering 3102 over a particular file 3106, thereby revealing a tool tip 3104 ("Add this file to Chatterbox"). Clicking on the tool tip 3104 adds the corresponding file to the Chatterbox folder.

Referring now to FIGS. 32-38, various techniques for adding a "group" object to the Chatterbox folder in accordance with various embodiments will now be described.

Figure 32:
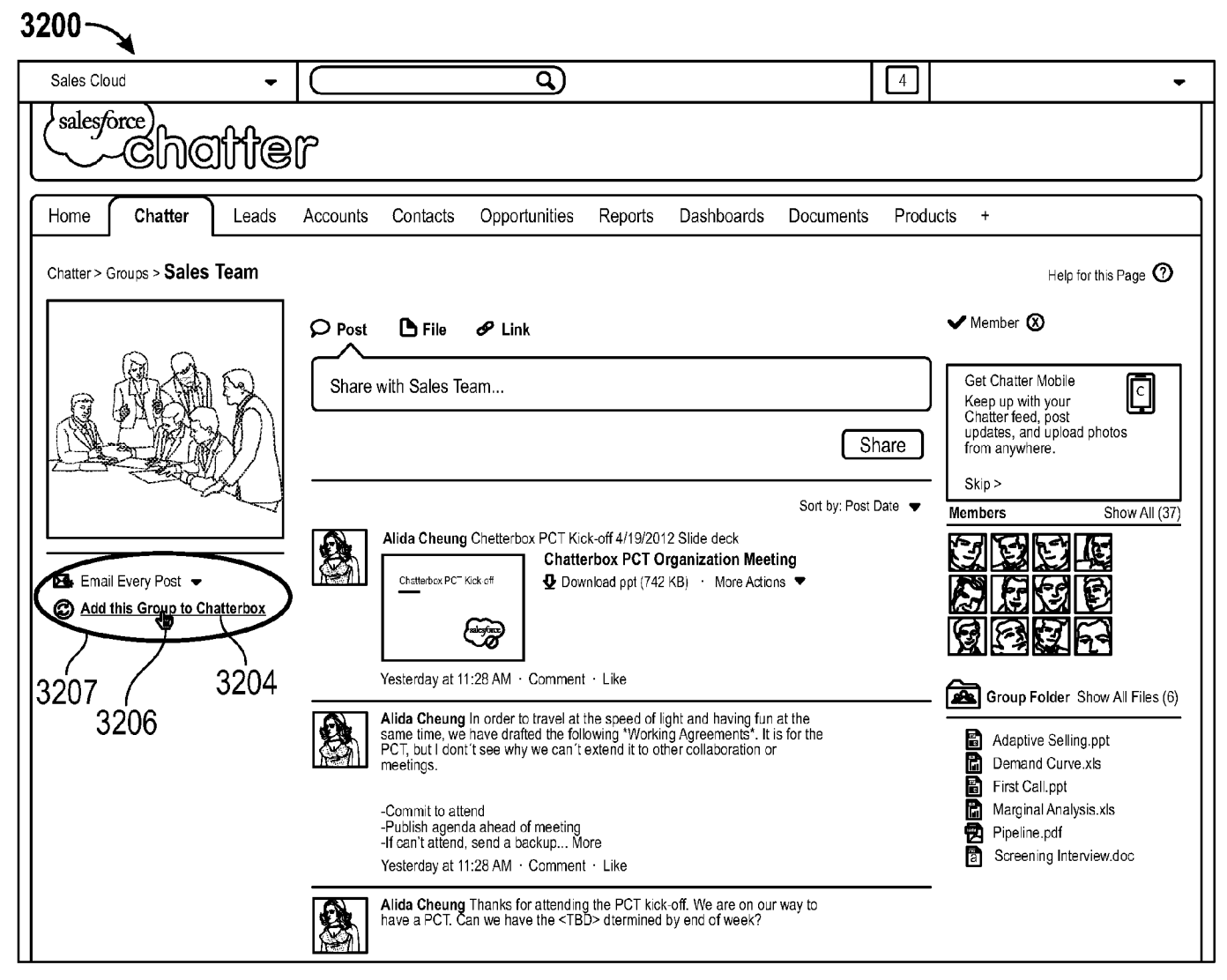
Figure 33:
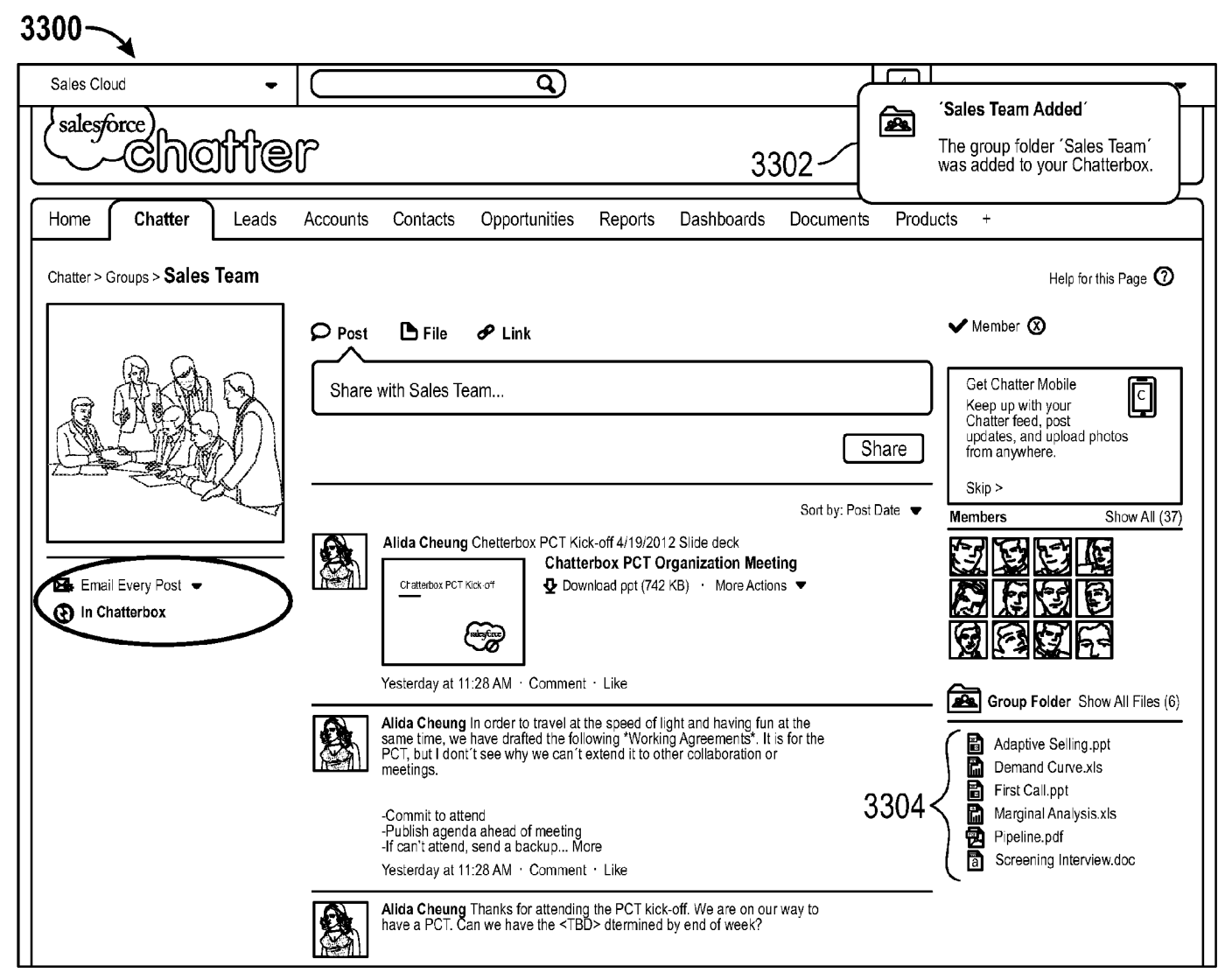

FIG. 32 is a screen shot 3200 of a Chatter view web page, showing email options 3202 including an "Add this Group to Chatterbox" option 3204. By clicking 3206 this option, the entire folder associated with the "Sales Team" group may be added to the Chatterbox folder. In this regard, FIG. 33 is a screen shot 3300 showing a notification icon 3302 confirming that the "Sales Team" group folder was added to the Chatterbox folder. The files 3304 within the Sales Team group folder are shown at the lower right hand corner of screen shot 3300.

Figure 34:
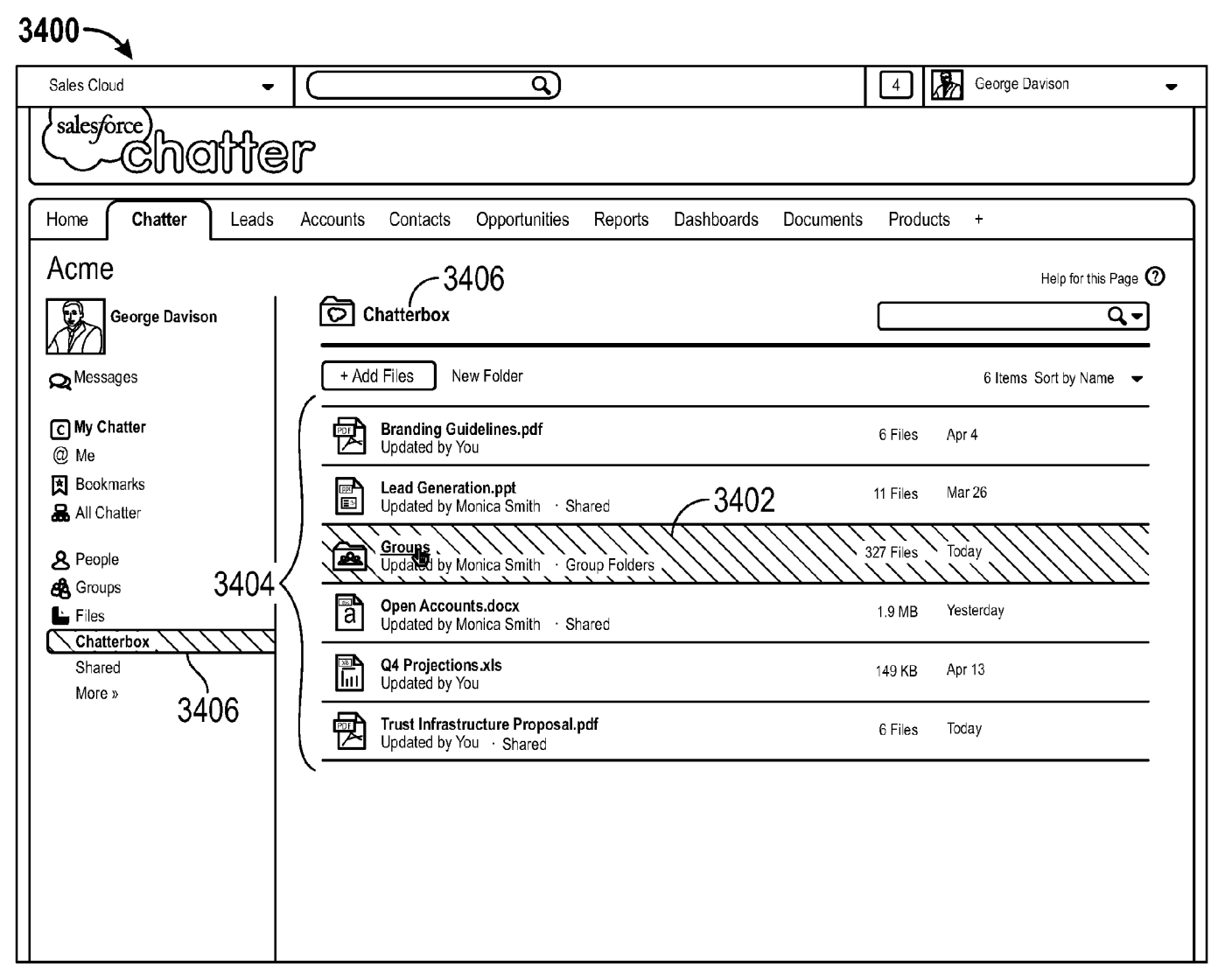
Figure 35:
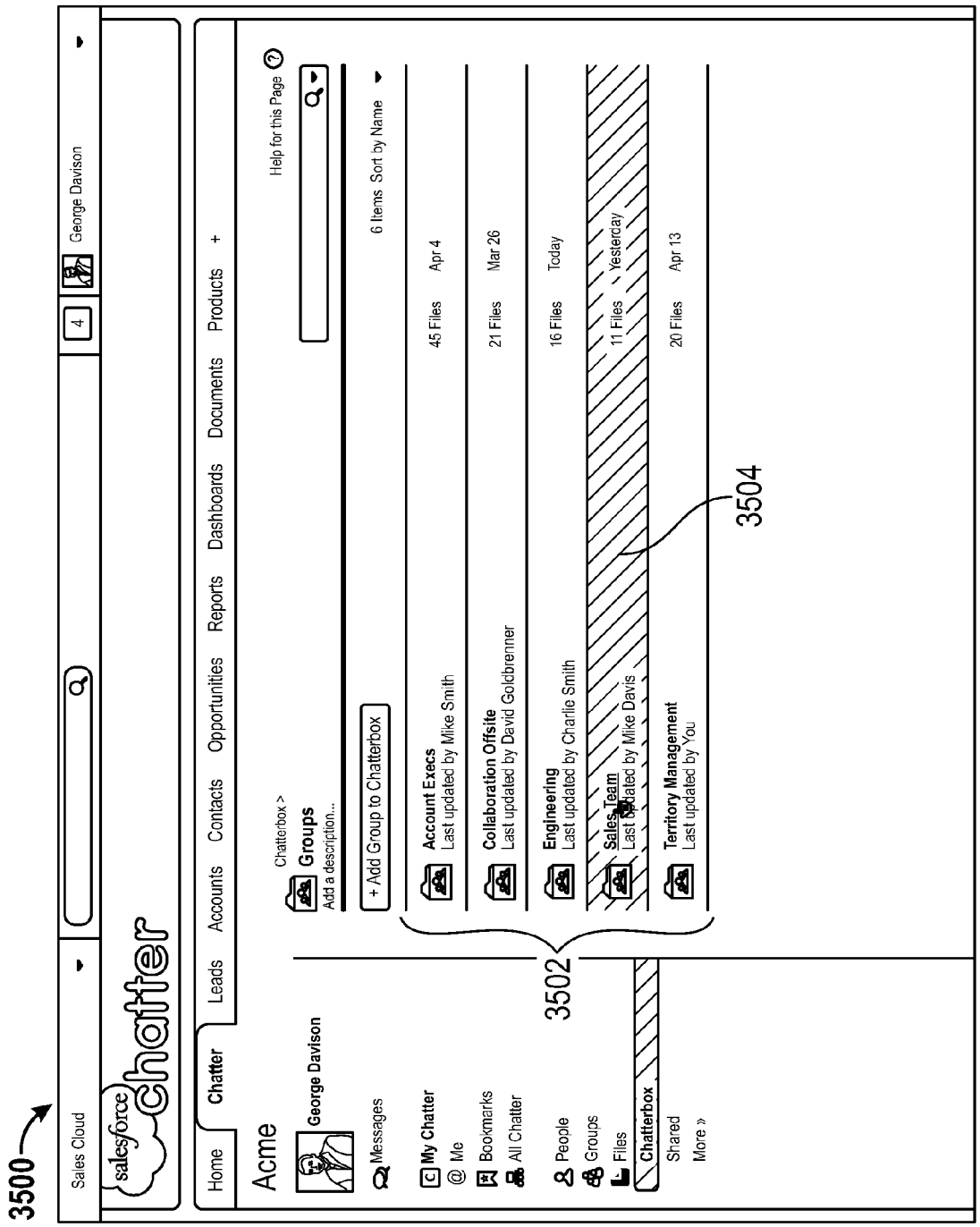

Referring now to FIG. 34, a screen shot 3400 illustrates that, after a group is added to the Chatterbox folder, that group folder 3402 appears in the root 3404 of the Chatterbox folder 3406. With reference to FIGS. 34 and 35, clicking on the groups folder 3402 reveals a list 3502 of folder which includes the groups added to the Chatterbox folder (including the Sales Team group folder 3504), as seen in the screen shot 3500 shown in FIG. 35.

Figure 36:
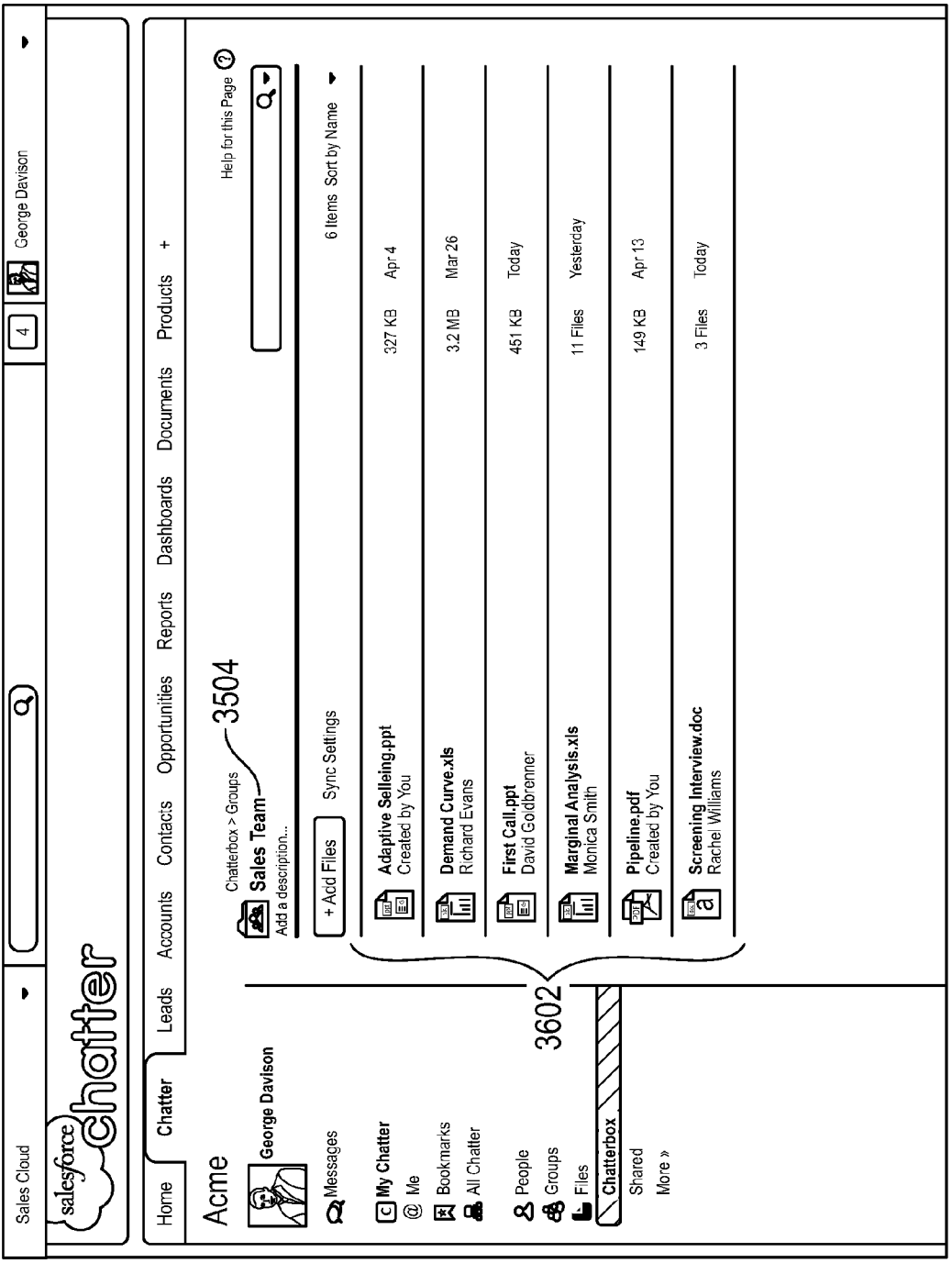

With reference to FIGS. 35 and 36, clicking on the Sales Team group folder 3504 reveals the files 3602 located in that folder, as shown in the screen shot 3600 shown in FIG. 36.

Figure 37:
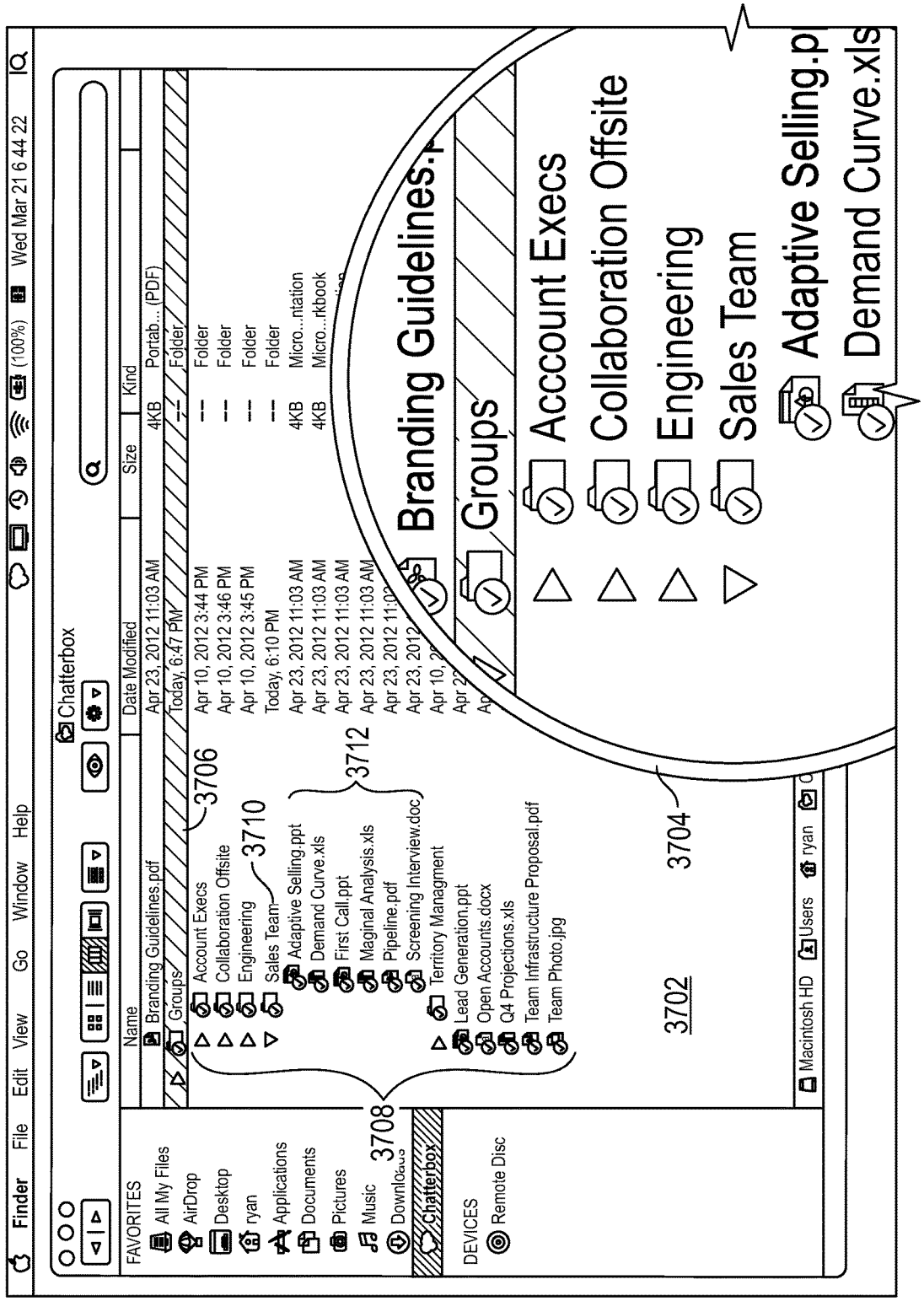

FIG. 37 is a screen shot 3700 showing the desk top OS view 3702 representing the same file hierarchy 3704 depicted in the previous Chatter environment; namely a groups folder 3706, a Sales Team group folder 3710 within the groups folder 3706, and the Sales Team files 3712 contained within the Sales Team group folder 3710.

Figure 38:
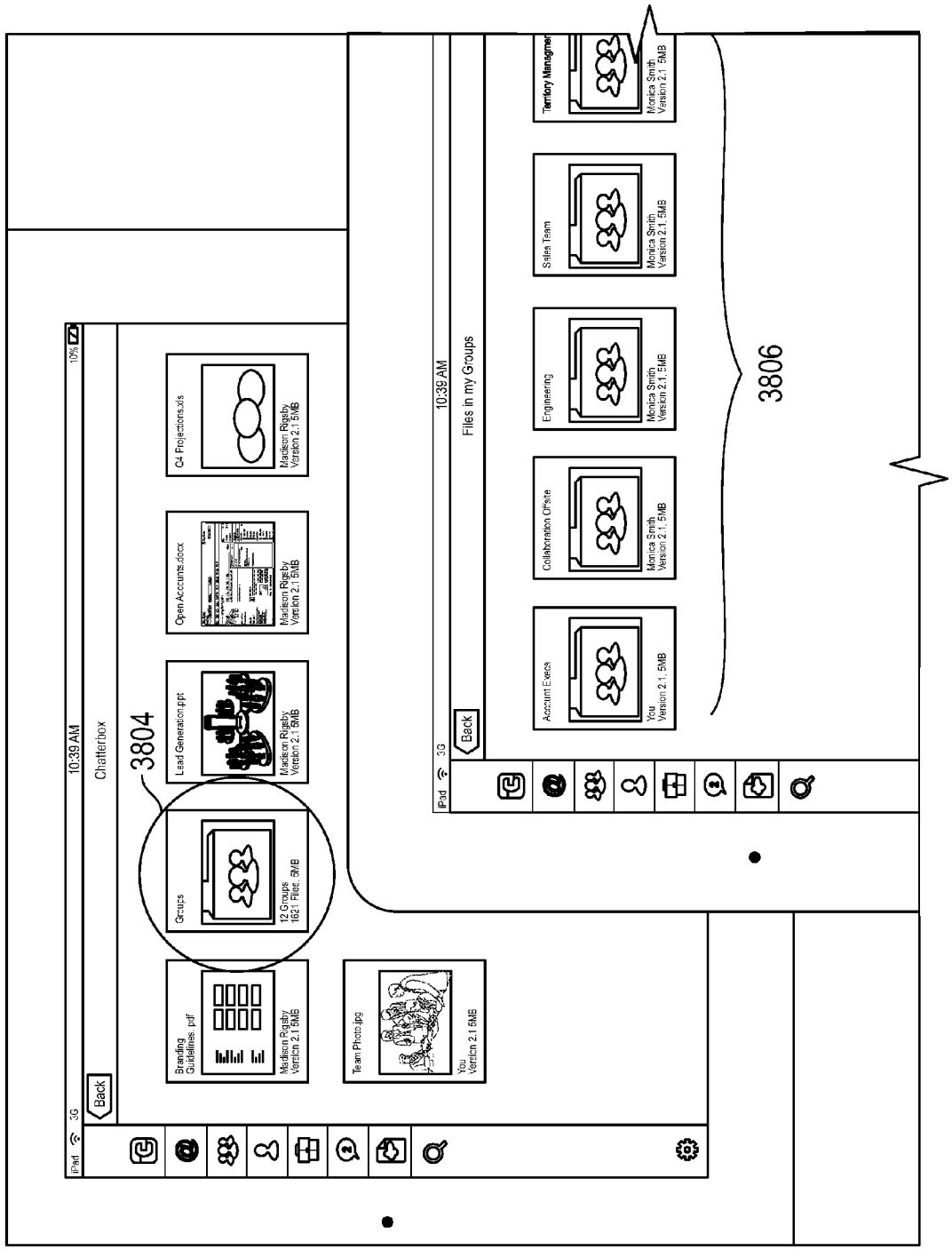

FIG. 38 is a screen shot 3800 illustrating an analogous file hierarchy in a tablet environment. In particular, screen shot 3800 shows a Chatterbox folder 3802 which includes a groups folder 3804. Within the groups folder 3804 are a number groups 3806, including the Sales Team group folder 3808.

In accordance with various embodiments, data and files can be automatically shared with specified groups, chatter groups (including those with external customers), all of a user's social networking contacts, or no one. The latter case (no one) is considered a default position, and can simply back up data and files to the cloud or to a user's other devices. It is also contemplated that data and files can be shared based on defined criteria or metadata associated with the data/files being synchronized/shared. For example, if the metadata indicates that a particular file contains "HR documentation", the file can be automatically saved shared with HR-related groups, personnel, and the like, as desired.

Moreover, data synchronization/sharing may initiated when data (as opposed to a file) is updated. By way of non-limiting example, an automobile computer can be configured to automatically synchronize and share an updated data object when scheduled maintenance is due to be performed, and thereby cause a notification to the user's tablet, mobile phone, and the like.

FIGS. 39-46 are screen shots illustrating a method for targeting a group when adding content to a file synchronizing and sharing folder in accordance with various embodiments.

Figure 39:
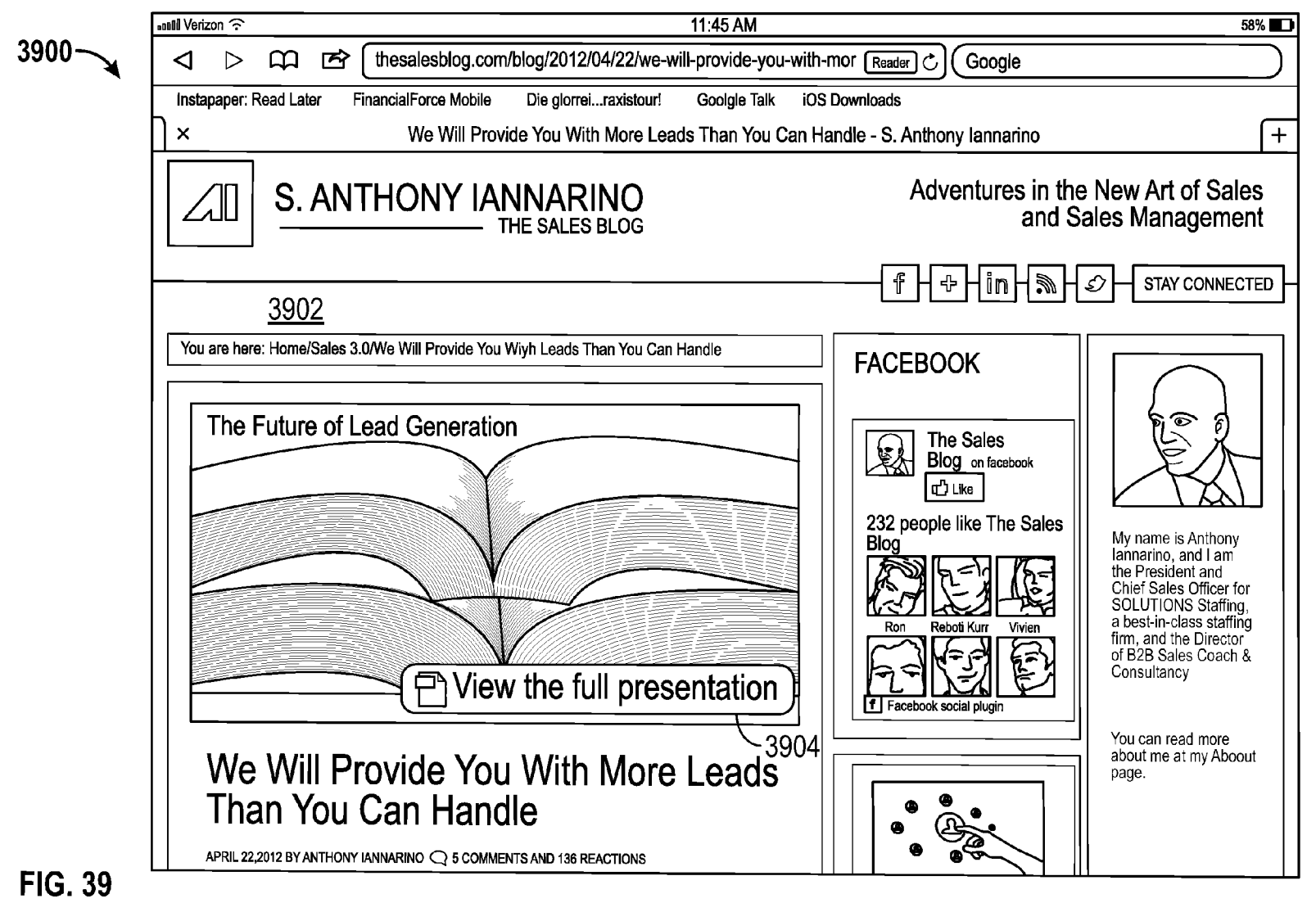
Figure 40:
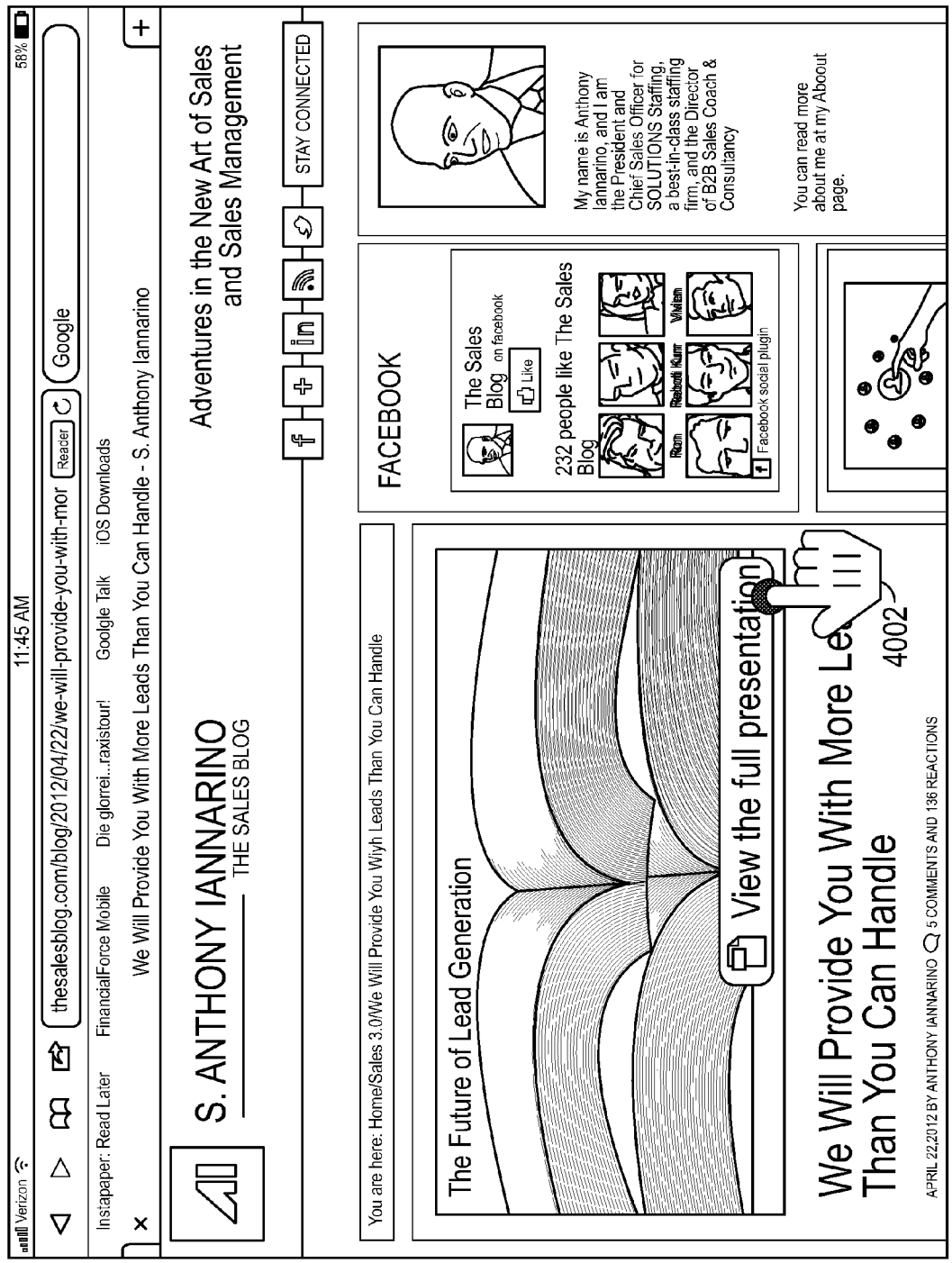
Figure 41:
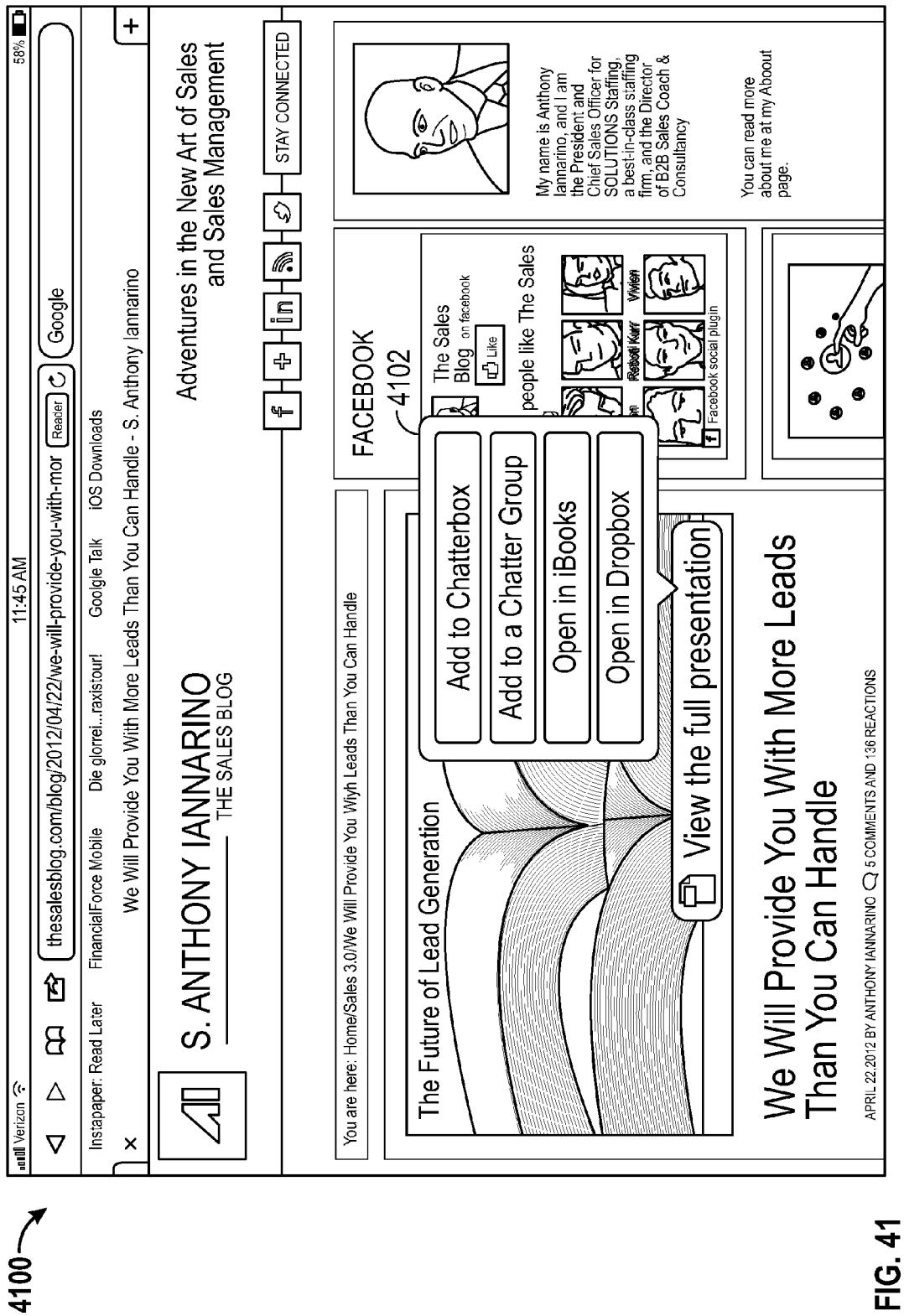
Figure 42:
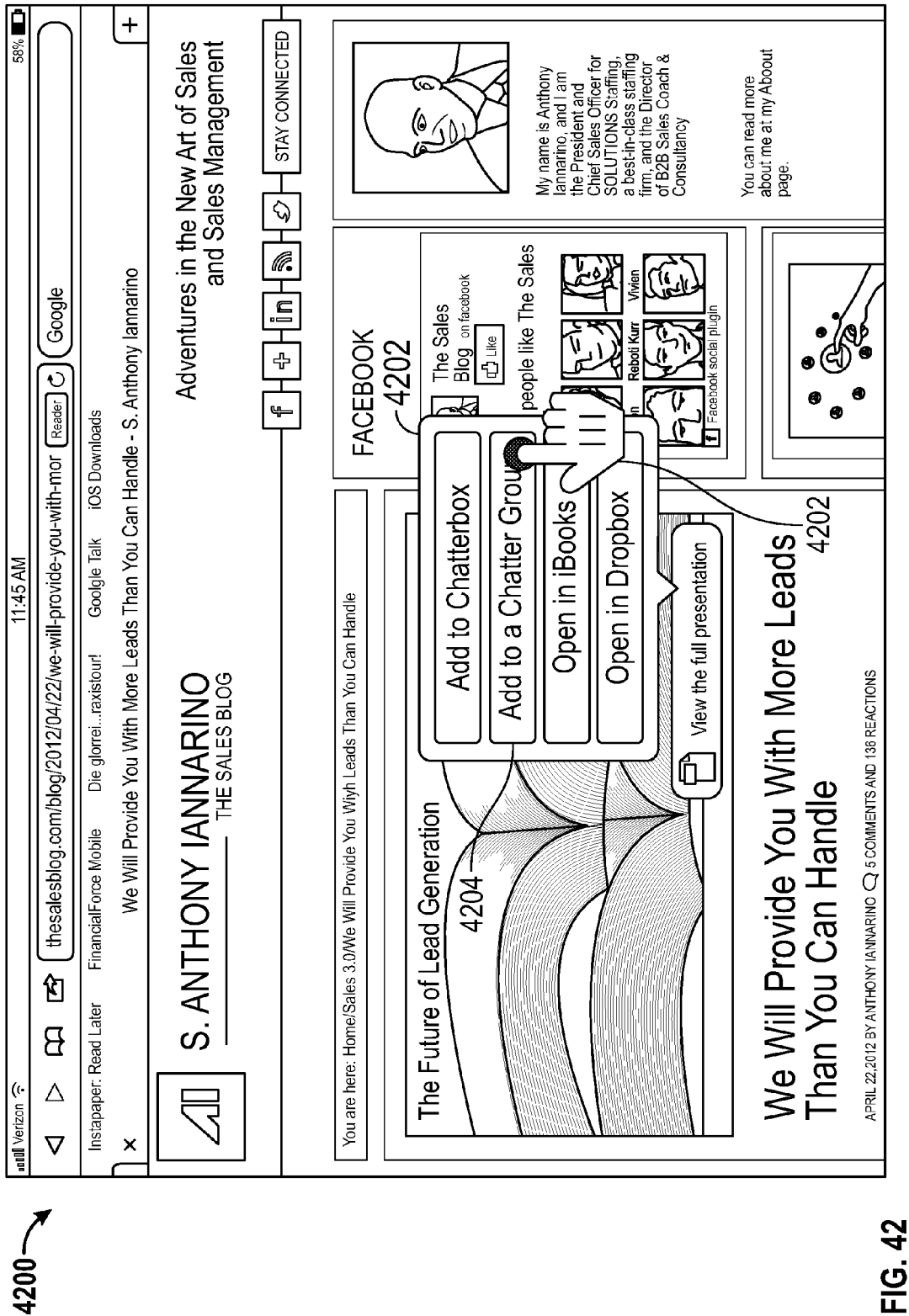
Figure 43:
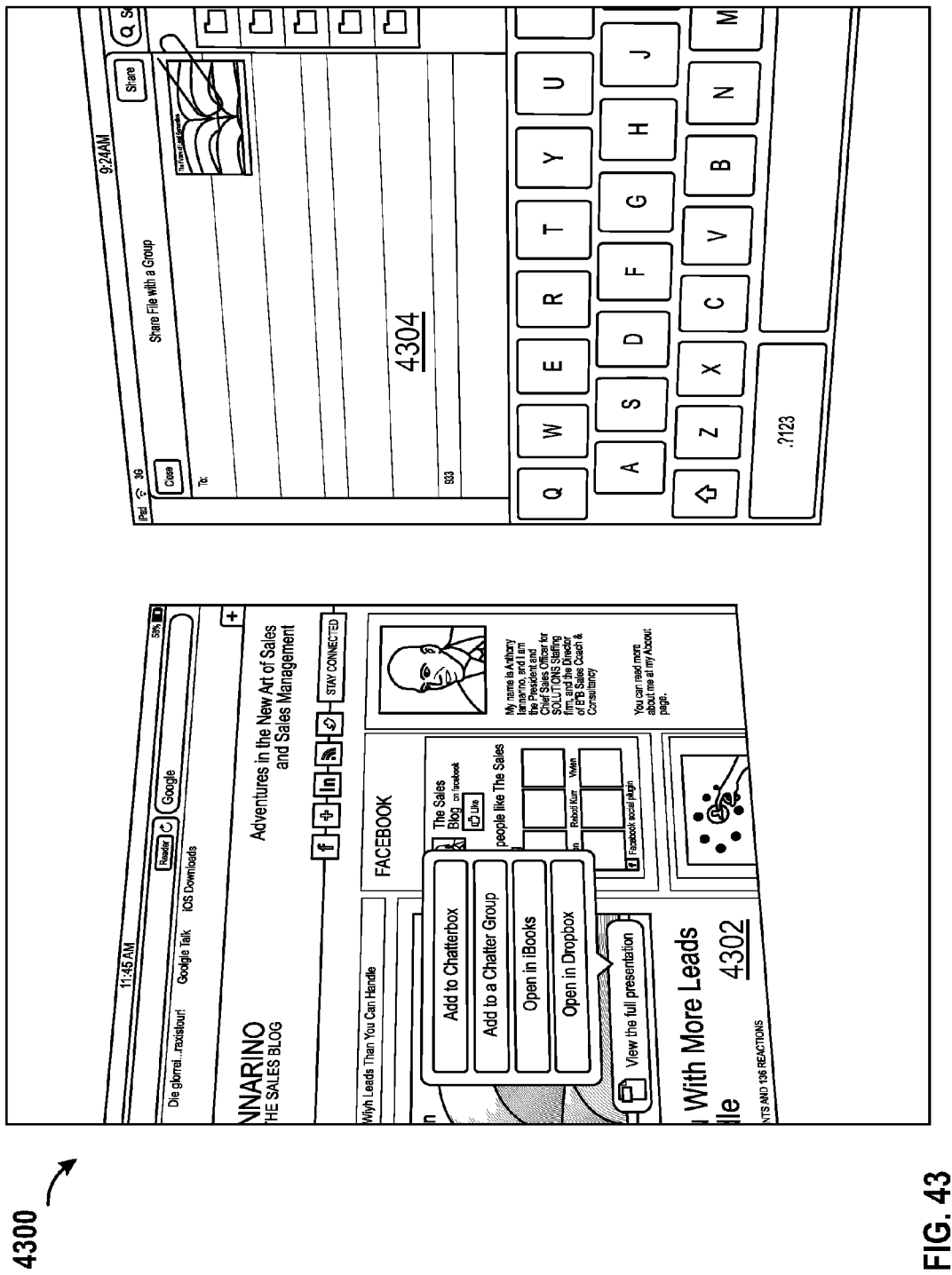

More particularly, FIG. 39 is a screen shot 3900 of an iPad OS view of a blog 3902 in a web browser, including a link 3904 to a PDF version of an article. FIG. 40 is a screen shot 4000 of a long press 4002 on the link 3904, which reveals a contextual menu 4102, as shown in a screen shot 4100 (FIG. 41). FIG. 42 is a screen shot 4200 showing the user clicking on the "Add to a Chatter Group" option 4204 from the menu 4102 to thereby add the PDF link to a Chatter group. Clicking option 4204 also switches the user from the browser to the Chatter view, as depicted in the side-by-side comparison of the browser view 4302 (showing the blog 3902) AND THE Chatter view 4304.

Figure 44:
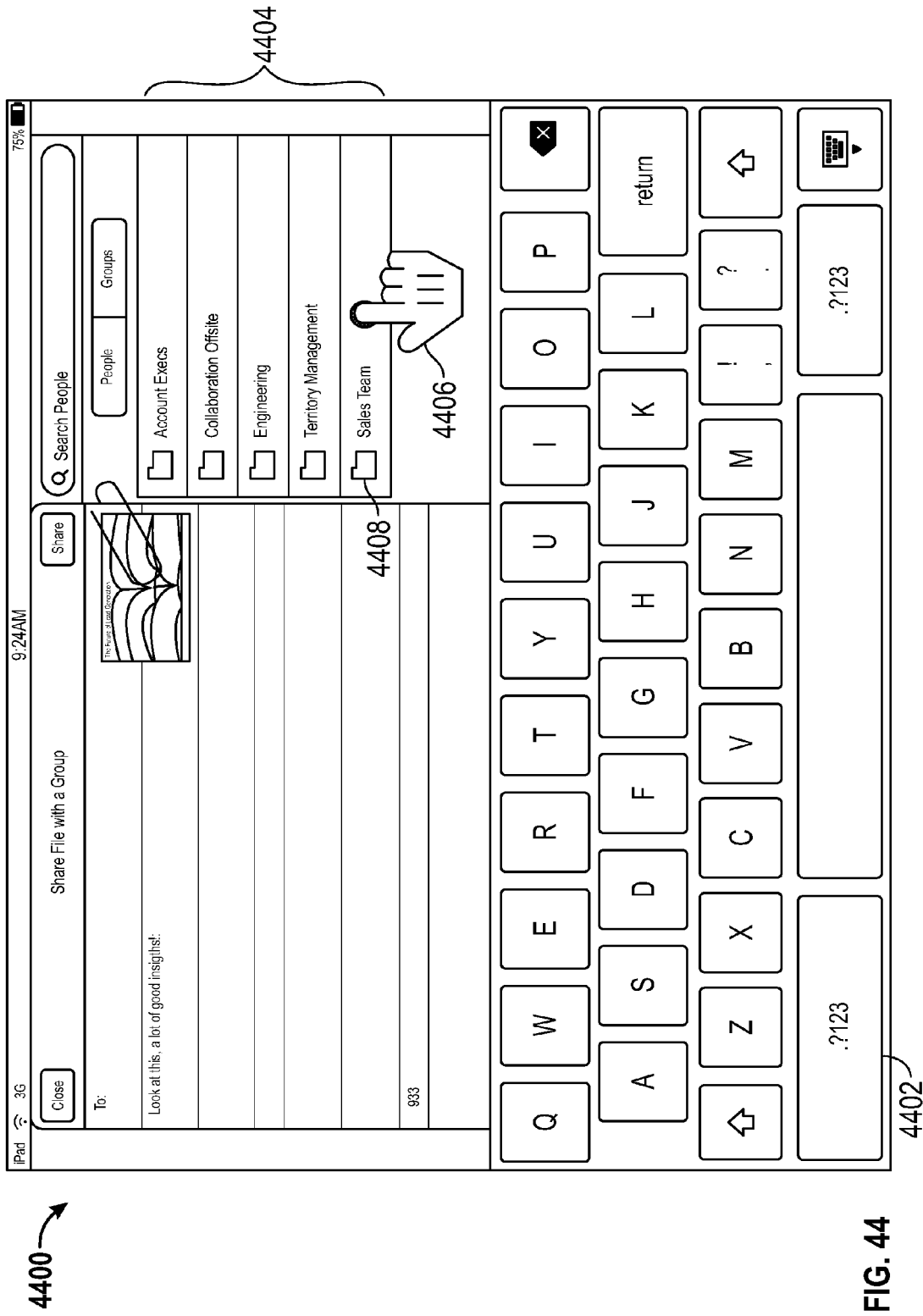
Figure 45:
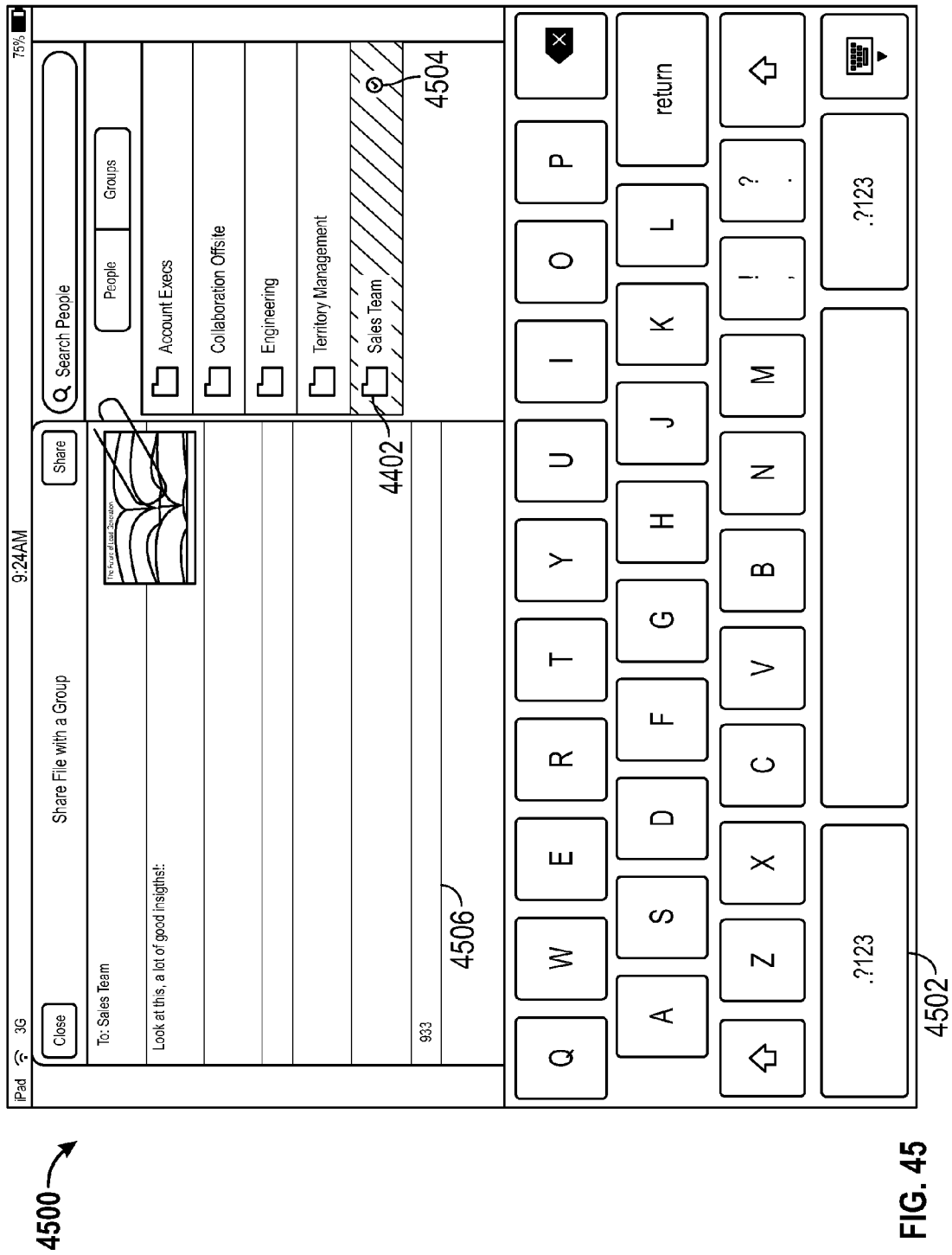

Referring now to FIG. 44, a screen shot 4400 shows, in the Chatter view, a file sharing page 4402 including a list 4404 of groups the user belongs to. The user selects the desired group 4408 from the list by clicking on it 4406. Referring now to FIG. 45, a screen shot 4500 confirms that the Sales Team group 4502 was selected by placing a check mark 4504 next to that group. Screen shot 4500 also illustrates a note pad presented to the user, prompting the user to write a note (if desired) to be attached to the shared file.

Figure 46:
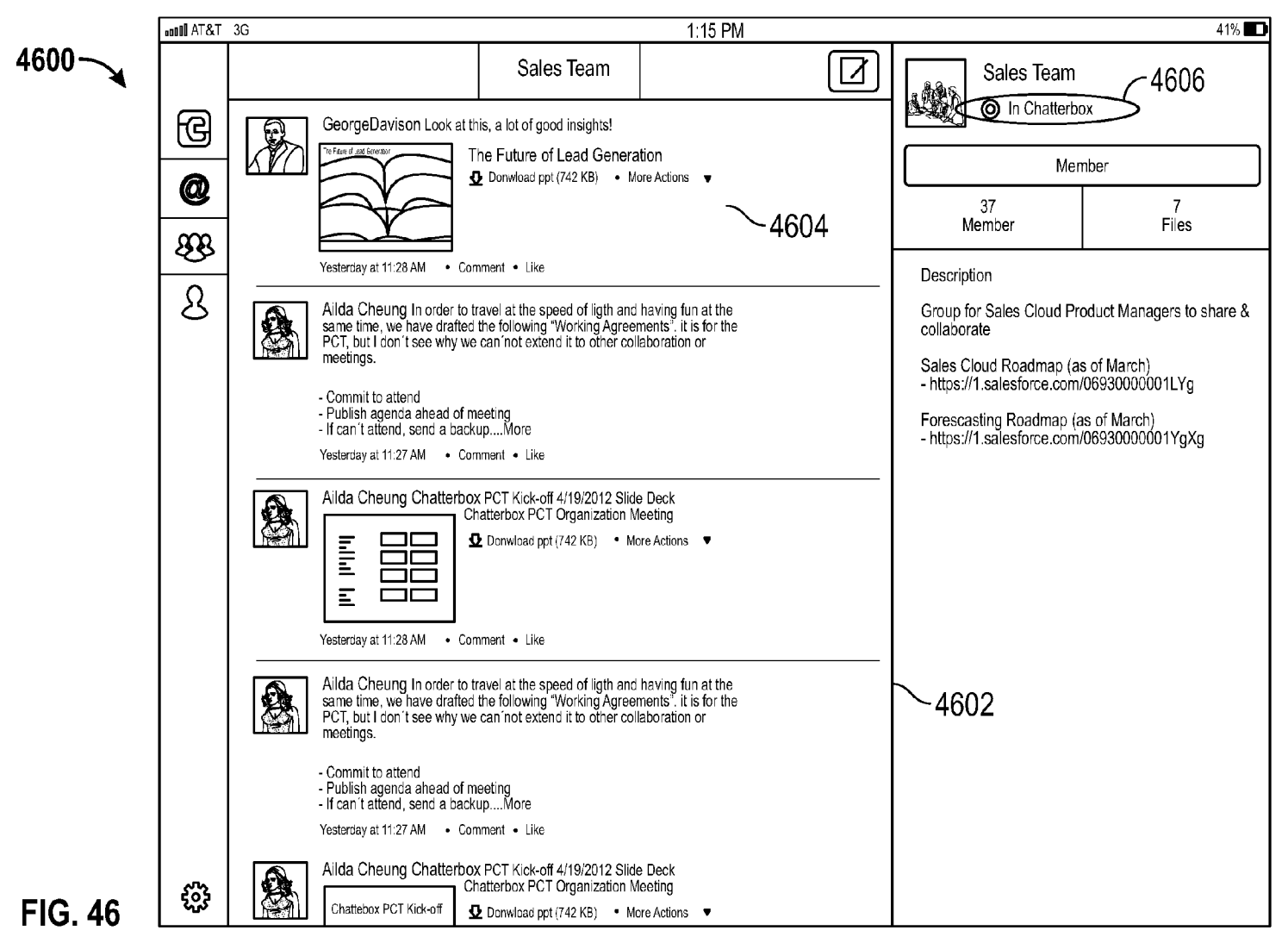

FIG. 46 is a screen shot 4600 showing the feed 4602 of the Sales Team group, including the linked article 4604. Screen shot 4600 also includes a notification 4606 confirming that the Sales Team group has been added to the Chatterbox folder.

It can thus be seen that in the context of the present disclosure, a data object can include a file such as a word processing document, photo album, video, song, Powerpoint or other presentation type, slide show, opportunity, group, data record (name, title, email address, postal address), or virtually any other type of content and/or information object.

A computer implemented application is thus provided for automatically synchronizing data objects between a local computing device and a remote multi-tenant database, and for automatically and seamlessly propagating the updated data object across other devices and users.

A method is provided for synchronizing and sharing data objects in a cloud based social networking environment of the type including a collaboration cloud. The method includes defining a sharing configuration within the collaboration cloud which includes a second computing device; running a dedicated client synchronization application on a first computing device; creating a sync folder on the first computing device using the client synchronization application; updating a data object using the first computing device; adding the updated data object to the sync folder; automatically synchronizing the updated data object with the collaboration cloud; and propagating, using the collaboration cloud, the updated data object to the second computing device.

In an embodiment, the step of defining involves defining a sharing configuration which also includes a plurality of additional computing devices, and the step of propagating further comprises propagating the updated data object to the plurality of additional computing devices.

In a further embodiment, the data object may consist of a text file, photo album, video, song, presentation, slide show, opportunity, group, or a data record. Moreover, the second computing device may include a desk top, laptop, tablet, smartphone, or a Google Glass™ device.

In a further embodiment, the second computing device is implemented in one of: an automobile, an aircraft, a television, and a hand held electronic device.

In another embodiment, defining involves configuring social networking affiliations.

In yet a further embodiment, the client synchronization application is configured to automatically synchronize the updated data object with the collaboration cloud upon saving the updated data object to the first computing device, and the client synchronization application is configured to automatically create the sync folder upon installing the client synchronization application on the first computing device.

In another embodiment, updating involves one of creating, revising, augmenting, deleting, and changing metadata associated with at least a portion of the data object.

In another embodiment, adding comprises manually moving the updated data object to the sync folder, for example, by dragging and dropping the data object into the sync folder.

In a further embodiment, propagating involves propagating the updated data object to at least one of the plurality of additional computing devices via email.

In another embodiment, the dedicated client synchronization application is or includes an application protocol interface (API).

In yet another embodiment, defining a sharing configuration is based on at least one metadata key word.

In a further embodiment, the method may involve sending a notification to the second computing that the data object has been an updated.

A method is also provided for synchronizing and sharing a data object between a first computing device and a plurality of collaborating computing devices using a cloud-based social networking server. The method includes: installing a client application on the first computing device and the collaborating computing devices; creating a sync folder on the first computing device using the client application; updating the data object; saving the data object to the first computing device; in response to saving, automatically synchronizing the updated data object with the server using the client application; and automatically pushing the updated data object to each of the plurality of collaborating computing devices.

In an embodiment, pushing involves at least one of: i) transmitting the updated data object; and ii) transmitting a notification that the data object has been updated. In another embodiment, pushing involves at least one of: i) sending the updated data object from the server to at least one of the plurality of collaborating computing devices; and ii) sending the updated data object from the first computing device to at least one of the plurality of collaborating computing devices via email.

In a further embodiment, the data object comprises one of: a text file, photo album, video, song, presentation, slide show, opportunity, group, and data record; the second computing device comprises one of a: desk top, laptop, tablet, smartphone, and Google Glass™; and updating comprises one of creating, revising, augmenting, deleting, and changing metadata associated with the data object.

A computer application is also provided. The application may be embodied in a non-transitory medium for operation by a computer processor associated with a social networking server, and configured to perform the steps of: defining a sharing configuration including a plurality of collaborating computing devices; receiving an updated data object from a client syncing application running on a first computing device; and automatically sharing the updated data object with the plurality of computing devices.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of synchronizing and sharing data objects in a cloud based social networking environment of the type including a collaboration cloud, the method comprising:
    defining a sharing configuration based on at least one metadata key word, within the collaboration cloud, the sharing configuration including a second computing device;
    running a dedicated client synchronization application on a first computing device;
    updating a data object using the first computing device;
    automatically synchronizing the updated data object with the collaboration cloud; and
    propagating, using the collaboration cloud, the updated data object to the second computing device.

2. The method of claim 1, wherein:
    defining comprises defining a sharing configuration which further includes a plurality of additional computing devices; and
    propagating further comprises propagating the updated data object to the plurality of additional computing devices.

3. The method of claim 2, wherein propagating comprises:
    propagating the updated data object to at least one of the plurality of additional computing devices via email.

4. The method of claim 1, further comprising:
    creating a sync folder on the first computing device using the client synchronization application.

5. The method of claim 4, wherein the client synchronization application is configured to automatically create the sync folder upon installing the client synchronization application on the first computing device.

6. The method of claim 4, further comprising:
    adding the updated data object to the sync folder.

7. The method of claim 6, wherein adding comprises:
    manually moving the updated data object to the sync folder.

8. The method of claim 7, wherein manually comprises:
    dragging and dropping the data object into the sync folder.

9. The method of claim 1, wherein defining further comprises:
    configuring social networking affiliations.

10. The method of claim 1, wherein the client synchronization application is configured to automatically synchronize the updated data object with the collaboration cloud upon saving the updated data object to the first computing device.

11. The method of claim 1, wherein the dedicated client synchronization application comprises an application protocol interface (API).

12. The method of claim 1, wherein the data object comprises one of:
    a text file, photo album, video, song, presentation, and slide show.

13. The method of claim 1, wherein the data object comprises:
    an opportunity.

14. The method of claim 1, wherein the data object comprises:
    a group.

15. The method of claim 1, wherein the data object comprises:
    a data record.

16. The method of claim 1, wherein defining a sharing configuration is based on at least one metadata key word, comprises:
    defining the sharing configuration based on the at least one metadata key word, wherein the at least one metadata key word is associated with data object.

17. The method of claim 1, wherein updating comprises:
    one of creating, revising, augmenting, deleting, and changing metadata associated with at least a portion of the data object.

18. The method of claim 1, wherein automatically synchronizing comprises:
    in response to updating the data object, automatically synchronizing the updated data object with the collaboration cloud without requiring additional user action at the first computing device.

19. A method for synchronizing and sharing a data object between a first computing device and a plurality of collaborating computing devices using a cloud-based social networking server, comprising:
    installing a client application on the first computing device and the collaborating computing devices;
    defining, via the first computing device, a sharing configuration within the collaboration cloud based on at least one metadata key word associated with the data object, the sharing configuration including the collaborating computing devices;
    updating the data object;
    saving the data object to the first computing device;
    in response to saving, automatically synchronizing the updated data object with the server using the client application; and
    automatically pushing the updated data object to each of the plurality of collaborating computing devices.

20. A computer application embodied in a non-transitory medium for operation by a computer processor associated with a social networking server for performing the steps of:
    defining, based on at least one metadata key word associated with a data object, a sharing configuration including a first computing device and a plurality of collaborating computing devices;
    receiving, from a client syncing application running on the first computing device when the data object is updated at the first computing device, an updated data object to automatically synchronize the updated data object at the social networking server, wherein the updated data object is automatically communicated to the social networking server by the client syncing application when the data object is updated at the first computing device; and
    automatically sharing the updated data object with the plurality of computing devices.

* * * * *